(12) United States Patent
Aujollet

(10) Patent No.: US 8,647,478 B2
(45) Date of Patent: Feb. 11, 2014

(54) HIGH TEMPERATURE, HIGH PRESSURE ELECTROLYSER WITH ALLOTHERMAL FUNCTIONING AND HIGH PRODUCTION CAPACITY

(75) Inventor: Patrick Aujollet, Pertuis (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 707 days.

(21) Appl. No.: 12/671,219

(22) PCT Filed: Jul. 31, 2008

(86) PCT No.: PCT/EP2008/060051
§ 371 (c)(1),
(2), (4) Date: Jan. 29, 2010

(87) PCT Pub. No.: WO2009/016228
PCT Pub. Date: Feb. 5, 2009

(65) Prior Publication Data
US 2010/0200421 A1    Aug. 12, 2010

(30) Foreign Application Priority Data
Aug. 2, 2007 (FR) .................................... 07 56900

(51) Int. Cl.
*C25B 9/10* (2006.01)
*C25B 1/04* (2006.01)

(52) U.S. Cl.
USPC ................ 204/241; 204/274; 205/628

(58) Field of Classification Search
CPC ........................................................ C25B 1/10
USPC ..................... 204/253, 257, 258, 241, 274; 205/628–632; 429/434, 435, 439, 442
See application file for complete search history.

(56) References Cited

U.S. PATENT DOCUMENTS

| | | | | |
|---|---|---|---|---|
| 3,975,913 A | * | 8/1976 | Erickson | 60/645 |
| 4,436,607 A | * | 3/1984 | Fischer | 204/246 |
| 5,964,089 A | * | 10/1999 | Murphy et al. | 60/286 |
| 5,977,785 A | * | 11/1999 | Burward-Hoy | 324/750.09 |

(Continued)

FOREIGN PATENT DOCUMENTS

| | | |
|---|---|---|
| FR | 988.211 | 8/1951 |
| WO | WO 01/11112 A1 | 2/2001 |
| WO | WO 2004/113590 A2 | 12/2004 |
| WO | WO 2004/113590 A3 | 12/2004 |

OTHER PUBLICATIONS

Shin et al. "Evaluation of the high temperature electrolysis of steam to produce hydrogen". International Journal of Hydrogen Energy. vol. 32, No. 10-11. Jun. 7, 2007. pp. 1486-1491.*

(Continued)

*Primary Examiner* — Nicholas A Smith
*Assistant Examiner* — Ciel Thomas
(74) *Attorney, Agent, or Firm* — Oblon, Spivak, McClelland, Maier & Neustadt, L.L.P.

(57) ABSTRACT

An electrolyser for high-temperature electrolysis configured to operate in an allothermal mode, including an enclosure configured to maintain an electrolytic bath under high or very high pressure of several tens of bars, in which at least one electrolysis plate is arranged, and a heater internal to the enclosure. The electrolysis plate includes a plurality of electrolysis cells lying side by side in substantially one same plane, each electrolysis cell including an anode and a cathode. The heater uses a heat-carrier fluid.

29 Claims, 29 Drawing Sheets

(56) References Cited

U.S. PATENT DOCUMENTS

| | | | |
|---|---|---|---|
| 6,254,741 B1* | 7/2001 | Stuart et al. | 204/254 |
| 6,554,978 B1* | 4/2003 | Vandenborre | 204/258 |
| 2001/0035345 A1* | 11/2001 | Nosaki et al. | 204/257 |
| 2002/0058175 A1* | 5/2002 | Ruhl | 429/32 |
| 2004/0084325 A1* | 5/2004 | Weinberg et al. | 205/628 |
| 2005/0087435 A1* | 4/2005 | Kong et al. | 204/164 |
| 2005/0183962 A1* | 8/2005 | Oakes | 205/340 |
| 2006/0237328 A1* | 10/2006 | Foster | 205/637 |
| 2010/0140102 A1 | 6/2010 | Aujollet | |

OTHER PUBLICATIONS

Bengt Sunden, "High Temperature Heat Exchangers (HTHE)", Proceedings of Fifth International Conference on Enhanced Compact and Ultra-Compact Heat Exchangers: Science Engineering and Technology, XP-002473777, Sep. 2005, pp. 226-238.

\* cited by examiner

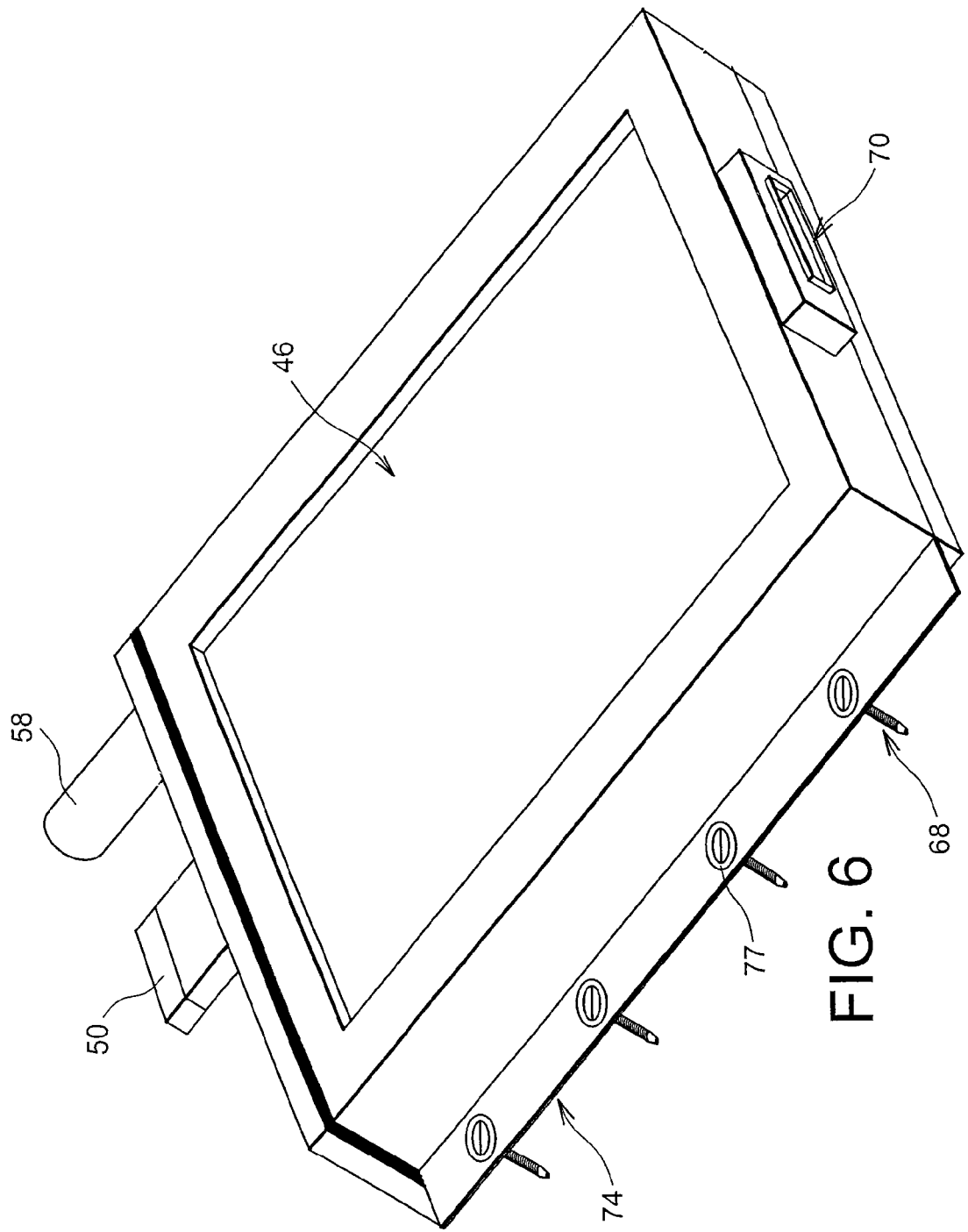

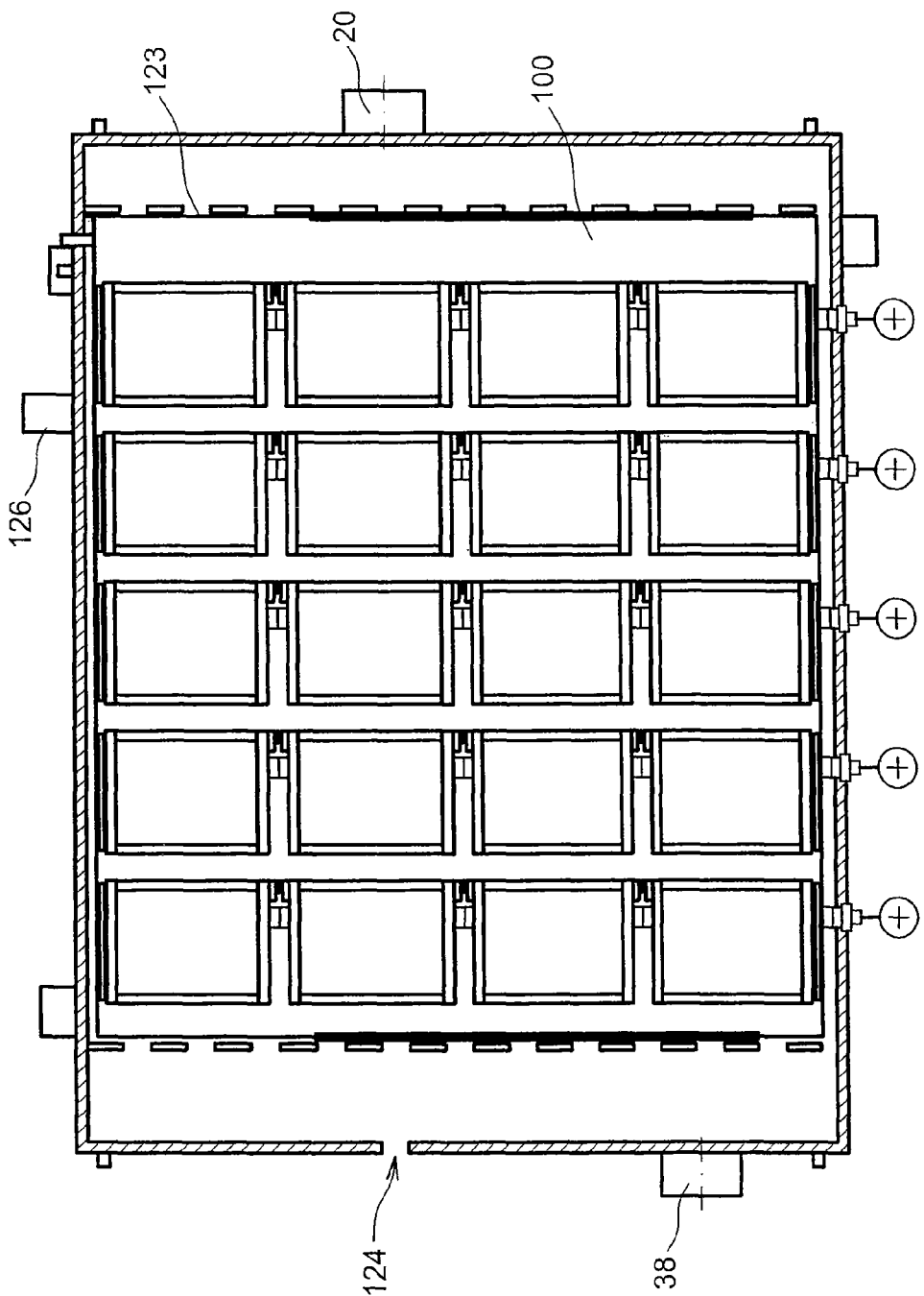

HIGH TEMPERATURE, HIGH PRESSURE ELECTROLYSER WITH ALLOTHERMAL FUNCTIONING AND HIGH PRODUCTION CAPACITY

TECHNICAL AREA AND PRIOR ART

The invention relates to high temperature endothermal electrolysis of about several hundred degrees Celsius, to decompose a reagent in liquid or vapour phase.

The present invention relates more precisely to a high temperature, high pressure electrolyser operating in allothermal mode and offering stable, homogeneous operating conditions.

In the remainder hereof, for clarity of the description, the example of water electrolysis will be used.

When setting up current at the terminals of an electrolyser, part of the energy supplied by the direct current source is converted into heat inside the different conductors and electric contacts, but also during transfer of ions through the electrolyte. All these dissipative phenomena contribute towards useless loss of electric energy, current technological developments focusing both on the limiting of these phenomena and on the duration of stable functioning of electrolysers.

Also, the energy input required for the decomposition reaction of the water molecule can be broken down into part electric energy and part heat. The maximum quantity of heat which can be absorbed by the water decomposition reaction increases with temperature.

Current experimental results show that below a temperature threshold in the order of 750° C. electrolysers can only have exothermal operation i.e. the heat generated by dissipative phenomena related to the establishing of electric current is equal to or more than the heat which can be consumed by the water electrolysis reaction. The excess heat must then be transmitted to a cold source.

Over and above this threshold temperature in the order of 750° C. which shall be designated the electrolyser endothermism threshold, electrolysers may have autothermal functioning i.e. all the energy required to decompose the water molecule i.e. work and heat, is provided by the electric current supplying the electrolysers.

Above this temperature threshold, theory and experimental results show that electrolysers may advantageously have endothermal functioning i.e. allothermal that is to say that part of the energy required for decomposing the water molecule is transmitted directly in the form of heat from an external heat source to the electrolyser.

Endothermal i.e. allothermal operation is preferable since it allows a reduction in the quantity of electric energy that needs to be supplied to the electrolyser to allow electrolysis.

A water-electrolyser is known called an alkaline electrolyser in which the electrolysis reaction is conducted in an alkaline liquid medium. The anode and cathode are separated by an ion membrane or diaphragm in which $OH^-$ ions circulate.

The reactions at the electrodes are written:
At the cathode: $2H_2O+2e^- \rightarrow H_2+2OH^-$
At the anode: $2OH^- \rightarrow \frac{1}{2}O_2+2e^-$ This electrolyser operates at temperature values lower than the saturation value of the alkaline solution (from 80° C. to 90° C. under one bar and 130° C. to 160° C. under 30 bars).

The difference in potential to be maintained between the electrodes varies between 1.75 V and 2.05 V depending on the electric resistance values of the electrodes and membrane (resistance to passing of the $OH^-$ ion). These values are greater than the value of the theoretical difference in potential (in the order of 1.49 V at this temperature level) that is strictly necessary for the decomposition reaction of liquid water.

On account of dissipative thermal phenomena related to over-voltages activating chemical reactions and to the low conductivity values of the electrodes, of the alkaline solution and ion membrane, between 15% and 25% of the total electric energy supplied to the equipment will be lost in the form of heat transmitted to the cold source. The functioning of this electrolyser is therefore solely exothermal.

An electrolyser also exists having a proton membrane whose operation is exothermal, in which electrolysis is conducted in vapour phase. The anode and the cathode are separated by a proton membrane in which $H^+$ ions circulate. The reactions at the electrodes are written:

At the anode: $H_2O \rightarrow \frac{1}{2}O_2+2H^++2e^-$
At the cathode: $2H^++2e^- \rightarrow H_2$ The operating temperature of this type of electrolyzer is limited by the mechanical resistance of the polymer membrane, lying the range of [300-400° C.]

Electrolysers also exist which operate at very high temperatures, called electrolyte high temperature electrolysers, derived from Solid Oxide Fuel Cell terminology, which operate in autothermal mode. These electrolysers are currently at the experimental stage or are demonstration prototypes, and are supplied with water vapour or a vapour/hydrogen mixture at very high temperature, but they cannot operate under high pressure i.e. several tens of bars of water vapour or food-grade mixture.

The oxidation-reduction reactions at the electrodes are written:

At the anode, oxidation of the oxygen ions:

$$O^{2-} \rightarrow \frac{1}{2}O_2+2e^- \qquad (I)$$

At the cathode, reduction of water vapour:

$$H_2O+2e^- \rightarrow H_2+O^{2-} \qquad (II)$$

To arrive at the global reaction:

$$H_2O \rightarrow H_2+\frac{1}{2}O_2.$$

The superheated water vapour arrives at the cathode. At the reaction sites, it is reduced to form hydrogen and $O^{2-}$ ions. The water vapour becomes enriched with hydrogen whilst the $O^{2-}$ ions migrate through the membrane under the effect of the electric field. At the anode, ions release their electrons to form oxygen molecules.

The electrode materials commonly used are of metal ceramic type deposited on a metallic bipolar plate, and the electrolyte material is of ion-conductive ceramic type. These ceramic materials have electric and ionic resistivity values which decrease with temperature, which tends to reduce the quantity of heat generated by passing of the electric current, with the increase in operating temperature.

The design of electrolysers currently being developed, in which the outflow of the water vapour/hydrogen mixture under pressure takes place in a cavity formed by the electrodes in ceramic material surrounded by air at atmospheric pressure, does not at the present time allow this type of electrolyser to operate at high pressure i.e. several tens of bars of gas mixture.

On the other hand, a decrease in the quantity of heat generated by dissipative phenomena and the changing thermodynamic characteristics of the water decomposition reaction with temperature value, mean that this type of electrolyser is able to operate endothermally, but in this case this requires maintaining the water vapour at a temperature higher than the endothermism threshold throughout the entire electrolyser.

There are currently two solutions to provide the heat required for functioning of an electrolyser in endothermal mode.

The first solution consists of providing this energy by direct heating of the water vapour to be decomposed by means of a heat exchanger positioned upstream of the electrolyser. However, simulation thermal calculations of an electrolyser functioning endothermally show:

that, to maintain good conditions for endothermal functioning i.e. a temperature higher than the endothermism threshold in the entire electrolyser, it is necessary to have strong superheating and a high flow rate of the water vapour on entering the electrolyser which, having regard to the required temperature (over 1100° C. in this case) will greatly increase the costs of the boiler and of the entire installation, that this solution is not the best indicated to provide stable, homogeneous temperature conditions for electrolyser operation, unless the food-grade water vapour is supplied at high mass flow rates.

This translates as very large capacity packaging and recirculation installations when the water vapour pressure tolerated by the installations, in particular the electrolyser, cannot exceed a few bars. This also translates as high flow rates, hence head losses, in the exchanger, electrolyser and piping, which will impact energy costs for compression equipment.

The second solution consists of providing the necessary heat by means of a hot heat-transfer gas mixed with water vapour or water vapour/hydrogen mixture entering the electrolyser, this solution requiring additional equipment to separate the chemical bodies downstream of the electrolyser in order to collect the heat-transfer gas, which causes losses of heat-transfer gas. It also requires a high mass flow of heat-transfer gas under low pressure, leading to limited performance i.e. gas head losses through the electrolyser and limited electrolyser power.

Document WO2004/113590 describes a device to carry out alkaline electrolysis which takes place in liquid phase only, which limits the operating temperature to values below the critical temperature of water which is 374° C. Therefore, it is not possible with this device to operate in a temperature range allowing reversible voltages values to be achieved in endothermal mode. To reach sufficiently low reversible voltage values at said temperature for operation in endothermal mode, very low pressure values must be reached largely lower than 1 bar, which prevents any application to large or medium-size installations. It is effectively not possible to design piping and compression stages that can avoid too great head losses at such low pressure levels.

Therefore currently known solutions do not allow an efficient reduction in the consumption of energy to be supplied to an electrolyser, since significant overheating is required.

Hence there are no solutions at the present time allowing the production of a substantial quantity of hydrogen at high temperature and pressure and in endothermal mode with low intensity electric currents.

Therefore it is one of the objectives of the present invention to provide an electrolyser capable of operating at high pressure in endothermal mode with optimized energy consumption and operation at stable, homogeneous temperature, offering a large production capacity.

DESCRIPTION OF THE INVENTION

The previously stated objectives are attained with an electrolyser consisting of a chamber that is tight at high pressure in which electrolysis supporting plates are alternately arranged with heating plates. On each supporting plate, a mosaic of small-sized electrolysis cells is plated of which at least part is mounted in series, which makes it possible to limit the intensity of the electric current passing through the different cells of the electrolyser, and hence to limit the electric power dissipated in the form of heat.

The heating plates can provide the electrolyser with the necessary quantity of heat for its functioning, since the heat is no longer provided by Joule effect due to functioning under endothermal mode with reduced irreversibility terms. The use of heating plates integrated in the electrolyser makes it possible to maintain the temperature of all the electrolysis cells with a variation in temperature of less than 30° C. between the inlet and outlet of the electrolyser and with superheating of the hot source of less than 50° C. relative to the operating temperature of the electrolyser.

According to one preferred embodiment of the present invention, an electrolyser is provided using a high number of small-sized elementary cells mounted in series, which makes it possible to limit the intensity of the electric current passing through the different cells of the electrolyser, and hence to limit the electric power dissipated in the form of heat. With mounting in series it is effectively possible, for electric supply to a supporting plate, only to require intensity that is equal to the intensity necessary for an electrolysis cell of very small size.

According to the present invention, advantageously provision is made to produce a high pressure electrolyser of electrolytic gas, so that it is possible to produce substantial quantities of hydrogen with installations of acceptable size. Functioning at high pressure also makes it possible to reduce the volume flow rates of circulating electrolytic gas and hence the head losses related to its circulation in the electrolyser and in the other installations, permitting a reduction in the electric consumption of the circulators. Functioning of the electrolyser at high pressure according to the invention therefore allows improved performance in hydrogen production of the entire installation.

With the present invention it is also possible to manufacture electrolysers adapted to the current characteristics of an electricity distribution network in relation to the number of electrolysis cells arranged on each support plate and to the connections between the support plates, which means that it is possible to simplify the design of the hydrogen production factory. It also permits a reduction in the electric consumption of the production factory, notably by reducing losses through Joule effect.

According to the present invention, provision is also made for an electrolyser comprising a metallic confinement to maintain the vapour under high or very high pressure of several tens of bars. The electrolysis plates are then advantageously subjected to mechanical compression forces since the formed gases it contains are under a lower pressure than the gas in which they bathe.

The design of the cells and their arrangement in a pressurized enclosure means that the cathode-electrolyte-anode assemblies are not subjected to stresses related to pressure differences between the flowing gases; The stresses due to differences in pressure between the water vapour and the produced gases, or between the water vapour and the heat-transfer fluid, or between the water vapour and the outside are borne by the internal parts of the vessel such as the uprights of the hollow metal frames in which the oxygen circulates at low pressure, by the grill of the heat exchangers for the heat-transfer fluid and by the enclosure of the electrolyser.

Therefore the cathode-electrolyte-anode assemblies can be optimized to offer reduced electric resistance by reducing their thickness, reduced ion resistance and reduced resistance to gas diffusion in the electrodes by increasing their porosity, whilst permitting high pressure operation within the enclosure of the electrolyser.

The heat-transfer fluid may be in liquid phase i.e. molten or gaseous metal or salt. According to one preferred embodiment, the heat-transfer fluid is a gas brought to a pressure slightly lower than that of the electrolysis gas, making it possible to reduce manufacturing mechanical constraints for the heating plates.

According to another aspect of the invention, the gases released by the electrolysis reaction are collected at each elementary cell by the supporting frame.

According to another aspect of the invention, all the support plates and electrolysis cells are contained within a high pressure enclosure.

The subject-matter of the invention is therefore an electrolyser for high temperature electrolysis capable of operating in allothermal mode, comprising an enclosure capable of maintaining an electrolytic bath under high or very high pressure of several tens of bars, in which at least one electrolysis plate is arranged and heating means for an active fluid, the active fluid being intended to undergo high temperature electrolysis, said electrolysis plate comprising a plurality of electrolysis cells lying side by side substantially in one same plane, each electrolysis cell comprising an anode and a cathode, separate from the respective anodes and cathodes of the other cells, at least one part of said electrolysis cells of an electrolysis plate being electrically connected in series.

The electrolytic bath is advantageously in gaseous form.

The heat-transfer fluid may be a gas under high pressure e.g. helium. It may also be a molten metal, for example zinc, or molten salts allowing head losses to be reduced.

In one example of embodiment, the electrolysis plate comprises a support plate provided with openings distributed in rows and columns on its two faces, the support plate being hollow to collect the gas produced at the anode, said plate comprising a manifold of said gas, at least part of the electrolysis cells being electrically connected in pairs by a connector comprising a frame added onto a cathode of a cell and a perforated plate added onto an anode of an adjacent cell so as to offer reduced electric connection resistance between the plates, and in which each opening is closed by an electrolysis cell, each anode facing towards the inside of the support plate.

Advantageously, the anode and cathode are held compressed with an electrolyte by the frame of a connector and the perforated plate of another connector.

The electrolyser may comprise assemblies of cells forming elongate arrays, each array comprising an identical number of anodes to the number of openings per row or per column, the arrays being connected in series.

The electrolyser may comprise a seal between each perforated plate and the contour of the associated opening, said seal being compressed by the fastening means of the cells onto the support plate and by the pressure of the electrolytic bath under high or very high pressure.

The cells of the two faces are connected in series, for example by a connector passing through the support plate or overlapping one of the side edges.

Advantageously, the electrolyser comprises an enclosure capable of maintaining an electrolytic gas under high or very high pressure of several tens of bars (from 30 to 120 bars, even beyond), which makes it possible to obtain gas production directly under high pressure produced by electrolysis, advantageously packaged for storage and transport without the need for, or at least by reducing the compression stages of the produced gases downstream of the electrolyser.

This also allows a reduction in the flow rates of the electrolysis gas between the different plates, hence a reduction in head losses in the electrolyser. For high production capacities of an installation, this also allows an acceptable size of the production unit whilst limiting head losses from gas flows making it possible to reduce the electricity consumption of the pressure-raising means in the circuits.

Advantageously, this type of electrolyser can permit operation at high, even very high pressures at the different stages of a production factory which may only, as compression equipment, comprise the pumps supplying the liquid to be electrolyzed at the factory supply stage. This allows compacting of the different stages of the factory and a reduction in the electricity consumption of the factory by reducing, even eliminating, the number of necessary compressors and reducing the capacity of the means to raise pressure in the circuits due to the reduction in head losses.

The electrolysis plate advantageously comprises a supporting frame comprising uprights which delimit rectangular windows arranged in rows and columns in which the electrolysis cells of matching shape are mounted.

Each electrolysis cell may comprise a central body formed of an electrically conductive core in the form of a plate, coated with the anode, itself coated with an electrolyte, itself coated with the cathode, and an electrically conductive casing surrounding the central body in electric contact with the cathode and exerting a compression force on the layers forming the central body, and an anode pin and cathode electric connection means carried by the casing. The cell is fixed onto the supporting frame by attachment lugs of the casing electrically insulated from the supporting frame.

The casing advantageously comprises two semi-frames derived from either side of the central body so as to apply the layers one against the other, means to electrically insulate the anode from the casing being provided between the core, anode and casing. These semi-frames rigidify the electrolysis cell.

The electrolyser advantageously comprises means to collect the gas or gases produced at the anode, towards outside the electrolyser. These collection means comprise at least one channel made in the anode and connected to a collection end-piece and the supporting frame, said supporting frame being hollow and forming a manifold for said gas or gases, the collection end-piece being sealingly connected to said supporting frame, said frame taking the produced gas or gases to outside the electrolyser, the pressure of the gas or gases produced at the anode being lower than the pressure of the electrolytic bath, the anode, electrolyte and cathode therefore being pressed one against the other.

The core of the electrolysis cell may therefore comprise grooves and reservoirs, one of the reservoirs being connected to the collection end-piece collecting the gas or gases, said end-piece being brazed onto a connector fixed to the supporting frame, means to insulate the anode electrically from the supporting frame being provided between the connector and the supporting frame.

The heating means are formed for example of at least one heating plate arranged parallel to the electrolysis plate, in which the heat-transfer fluid circulates.

The heat-transfer fluid can be heated for example by a conventional fossil fuel or biomass boiler, or a nuclear boiler at very high temperature, or by solar energy thereby reducing the recourse to electric energy.

The heating plate is of substantially the same size as the electrolysis plate and comprises a metal jacket in which a heat exchange body is arranged comprising a plurality of channels extending between one end supplied with hot heat-transfer fluid and one end connected to a manifold of cold heat-transfer fluid.

The enclosure may comprise side slides receiving the side edges of the heating plates and electrolysis plates, means to insulate the supporting frame electrically from the enclosure being provided in the slides. This facilitates assembly.

According to the invention, the electrolyser preferably comprises a plurality of electrolysis plates lying parallel to each other and a plurality of heating plates arranged either side of the electrolysis plates.

In one first embodiment, the electrolysis cells are distributed in rows and columns, the cells of one same column being electrically connected in series, the columns being connected in series and the electrolysis plates being connected to each other in series.

In a second embodiment, the electrolysis cells are distributed in rows and columns, the cells of one same column being electrically connected in series, the columns being connected in series and the electrolysis plates being connected in parallel.

In a third embodiment, the electrolysis cells are distributed in rows and columns, each column comprising a lower number of cells than the number of cells in series corresponding to the breakdown voltage, said columns all being connected in parallel from one plate to another.

The enclosure may comprise an orifice for the supply of active fluid, provided on a side wall orthogonal to the electrolysis plates, which allows simplified design of the enclosure.

The enclosure comprises at least one orifice for the collection of the gas or gases generated at the cathodes on an upper wall of the enclosure, which improves the safety of the electrolyser.

The electric connections between the different plates and with and an electricity supply source are advantageously provided on the outside of the enclosure. Further preferably, said electric connections are cooled. This improves conductivity.

A further subject of the present invention is an installation to produce gas by electrolysis comprising:
at least one electrolyser according to the present invention, electricity supply at a given voltage, wherein the cells of one same plate are connected in series, and the electrolysis plates are connected in parallel, the number of electrolysis cells per electrolysis plate being chosen in relation to the given voltage of the electricity supply.

This makes it possible to adapt the electrolyser easily to any type of supply.

A further subject of the present invention is an installation for the production of gas by electrolysis comprising:
at least one electrolyser according to the present invention, electricity supply at a given voltage, wherein the electrolysis cells are distributed in rows and columns, the cells of each column being connected in series, the columns being connected in parallel, the number of cells of each column being chosen in relation to the given voltage of the electricity supply.

This installation permits a very large gas production capacity.

A further subject-matter of the present invention is a method to manufacture at least one gas by electrolysis using an electrolyser according to the present invention, wherein the pressure of the electrolytic bath is substantially equal to or more than the storage and/or distribution pressure of said gas, for example between 30 bars and 130 bars.

The ratio between the molar flow rate of water vapour and the molar flow rate of the produced dihydrogen is advantageously 2 to 5, allowing a high dihydrogen vapour pressure to be obtained at the outlet of the electrolyser, whilst ensuring a sufficient layer of water on the electrolysis plate.

BRIEF DESCRIPTION OF THE DRAWINGS

The present invention will be better understood with reference to the following description and appended drawings in which:

FIG. 6 is a perspective view of the electrolysis cell, FIG. 15A, FIGS. 16A to 16C are respectively underside, longitudinal section and overhead views of a connection plate for the connection onto the upper chamber of the electrolyser according to the second embodiment, FIG. 17A is a cross-sectional view of the electrolyser according to a third embodiment at an electrolysis plate, FIG. 25, FIGS. 26A to 26C are perspective views of the electrolysis cells alone, and details thereof in the electrolysis plate shown FIG. 25.

DETAILED DESCRIPTION OF PARTICULAR EMBODIMENTS

By way of illustration, different operating schedules will be described of a high temperature, elementary water electrolysis cell consisting of an anode supplied by an electric current I, a cathode and an electrolyte. These different parts are formed of ceramic material.

The water decomposition reaction is an endothermal conversion, the Gibbs-Helmholtz equation showing that the variation in free enthalpy of a reagent-product mixture during an endothermal reaction decreases with the reaction temperature, which more schematically means that the higher the temperature of the water vapour, hydrogen mixture and formed oxygen, the smaller the part of electric energy required for decomposition of the water molecules, and the higher the part of thermal energy required to maintain the mixture at constant temperature.

Figure 21:
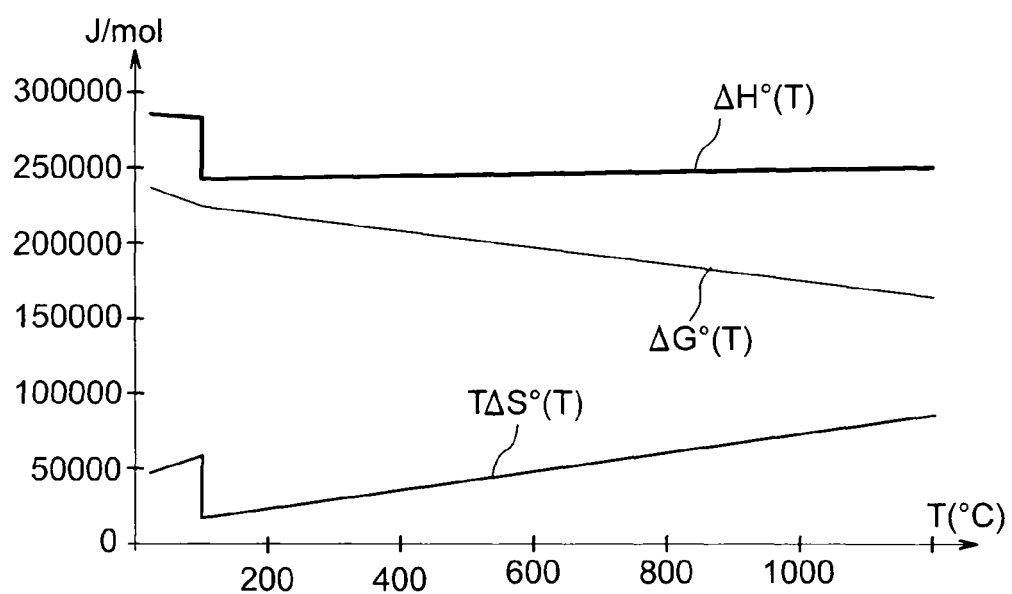
FIG. 21 illustrates the thermodynamic functions of the water decomposition reaction.

The values as a function of temperature of $\Delta G°$, $\Delta H°$ and $T*\Delta S°$, ($\Delta H°$ being the total energy demand $\Delta H°=T*\Delta S°+\Delta G°$) for decomposition of one mole of water under a pressure of 1 bar (standard conditions) are given by the curves $\Delta G°$, $\Delta H°$, $T*\Delta S°$ respectively in the graph shown FIG. 21 with, at saturation temperature, a decrease in $T*\Delta S°$ equal to the vaporization heat for one mole of water.

In the area concerned by the invention i.e. in vapour phase, the values of $\Delta H°$ and $\Delta S°$ are practically constant and the thermal energy which can be provided on decomposition of one mole of water vapour, represented by the product of entropy by temperature $T*\Delta S°$, is proportional to temperature. The term $\Delta G°$ (T) representing the electric energy demand for conversion of pure bodies at temperature T then decreases linearly with temperature.

Under these conditions, the global electrolysis reaction of one mole of water in vapour phase at temperature T and total pressure P is considered to be:

$$H_2O(g) \rightarrow H_2(g) + \tfrac{1}{2}O_2(g) \qquad (1).$$

This reaction is accompanied by a variation in free enthalpy $\Delta G$.

If, for simplification purposes, Raoult's law is assumed for mixtures of perfect gases, the variation in free enthalpy $\Delta G$ representing the electric energy demand for decomposition of one mole of water in vapour form is written:

$$\Delta G(T,P) = \Delta G°(T,P_0) + RT*\mathrm{Ln}(P_{H2}*P_{O2}^{1/2}/P_{H2O}),$$

in which $\Delta G°$ (T) is Gibbs' standard variation in free enthalpy at temperature T under $P_0=1$ bar.

$P_{H2}$, $P_{O2}$ are the partial pressures of the gases, in bars;

$P_{H2O}$ is the partial pressure of the water water vapour, in bars;

T is the temperature, in K;

R is the constant of perfect gases (8,314 J·mol$^{-1}$K$^{-1}$).

$\Delta G$ represents the energy to be provided to decompose one mole of water vapour at temperature T under total pressure P.

$2F*E$ is the electric energy provided at the time of changeover from zero reference potential to potential E of a charge of 2F (F being the Faraday number: absolute value of the charge of one mole of electrons i.e. 96485 C).

The absolute value of the equilibrium potential (at zero current) is therefore written:

$$E_{i=0} = \Delta G/2F.$$

Therefore according to Nernst's law:

$$E_{i=0} = E° + (RT/2F)*\mathrm{Ln}(P_{H2}*P_{O2}^{1/2}/P_{H2O})$$

E° being equal to $\Delta G°/2F$.

In a closed circuit, the voltage to be applied to the terminals of the electrolysis is greater than the reversible voltage $E_{i=0}$ given by Nernst's law. With the setting up of a current of intensity I in the different constituent parts of the cell, numerous phenomena of irreversibility occur.

The chief phenomena are:
  the resistances ($R_{ohmic}$) against passing of current in the materials forming the electrolysis plate and interconnections, which cause ohmic drops; one of the loss factors is related to the solid electrolyte,
  the electrode overvoltages ($\eta$) related to activation of elementary reactions at the electrode-gas interfaces and to diffusion of the gases in the electrodes.

The voltage to be applied to the terminals of the electrolysis cell is therefore written:

$$E = E_{i=0} + R_{ohmic}*I + \Sigma\eta.$$

Or:

$$E = E° + (RT/2F)*\mathrm{Ln}(P_{H2}*P_{O2}^{1/2}/P_{H2O}) + R_{ohmic}*I + \Sigma\eta.$$

The values of ohmic resistances and overvoltages depend on the physical characteristics of the electrolysers, they decrease with operating temperature.

Figure 22:
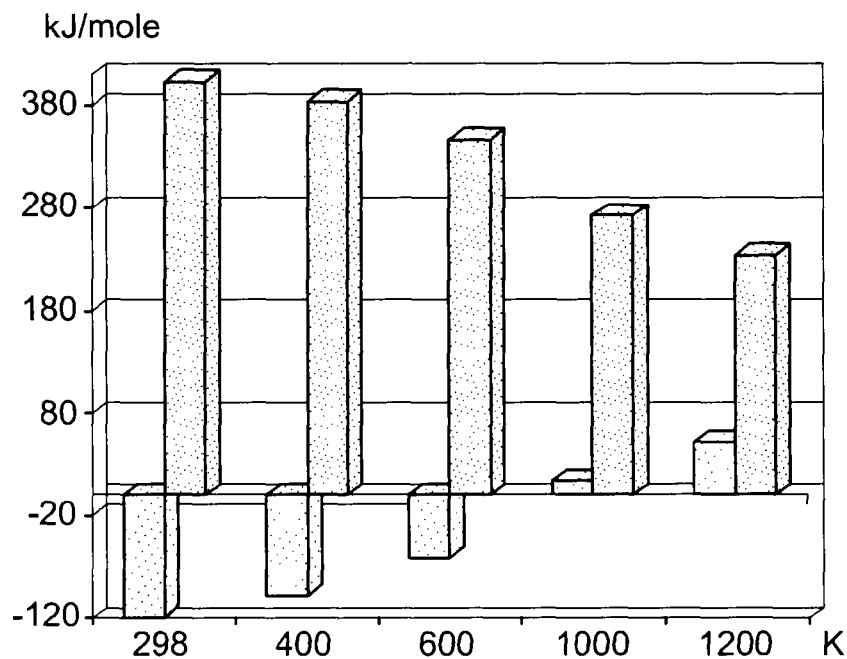
FIG. 22 illustrates the heat/electricity distribution in relation to temperature for current electrolysers, in the form of a stick graph.

As already indicated previously, for present-day equipment below a temperature threshold in the order of 750° C. (as can be seen FIG. 22) the quantity of heat generated by Joule effect, due to electric supply to the electrolysis cells, is greater than the heat consumed by the electrolysis reaction, the functioning of the assembly is therefore exothermal.

Current technological developments, notably in the choice of materials and reduction in electrode and electrolyte thickness having regard to mechanical resistance constraints, tend to lower the temperature threshold on and after which the electrolyser operates in endothermal mode.

During electrolysis, a quantity of energy corresponding to the entropic part T*LS must be supplied to the process in the form of heat. Part of this heat is produced by Joule effect within the electrolyser, depending on the current intensity I passing through the electrolysis cell:

If:

$$Rohmic * I^2 + \Sigma\eta * I > T * \Delta S * I/2F,$$

the electrolyser produces too much heat, it is in exothermal mode, in which case maintaining the reagents and products at constant temperature requires evacuation of the heat towards a cold source.

If:

$$R_{ohmic} * I^2 \Sigma\eta * I = T * \Delta S * I/2F$$

the electrolyser produces sufficient heat, it is in thermal equilibrium and maintaining the temperature of the reagents and products does not require an external heat source, the electrolyser is therefore in autothermal mode i.e. without any external heat source.

If:

$$R_{ohmic} I^2 + \Sigma\eta * I > T * \Delta S * I/2F,$$

the heat produced by the electrolyser is not sufficient to maintain the water decomposition reaction in thermal equilibrium, the electrolyze is in endothermal mode, the supply of heat from an external heat source being necessary to maintain constant temperature. The operating mode is then allothermal.

Figure 23:
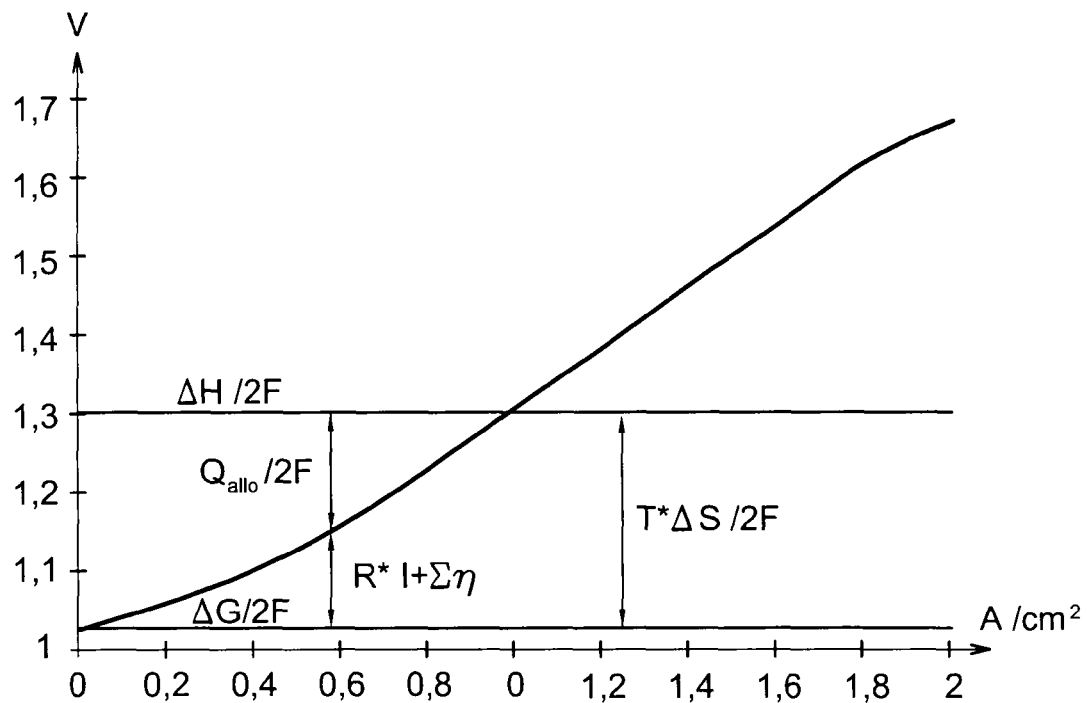
FIG. 23 is an example of an electrolyzer characteristic, in which the trend in potential is shown as a function of current density.

As an example, FIG. 23 shows the calculated trend in potential E ($E=E_{t=0}+Rohmic*I+\Sigma\eta$) shown as V, as function of current density $D_C$ on an electrolysis plate (ratio I/S in A/cm2 in which I is the intensity of the current supplied to the plate at A and S is the anode/electrolyte/cathode surface area in cm2) for a total pressure of 30 bars, a temperature of 900° C., a mean of the ratio H2/H2O fixed at 0.5 and an electrolyte thickness of 30 µm.

Above the potential V1 of value ΔH/2F, the functioning mode is exothermal.

The potential V2 of value ΔG/2F is the minimum potential required for electrolysis.

Between the potentials V1 and V2, the functioning mode is endothermal.

In the example of an electrolysis plate whose characteristic is shown FIG. 23, the current density value is 0.99 A·cm$^{-2}$, corresponding to the particular point of thermal equilibrium. Above this point, hydrogen will be produced in exothermal mode.

Endothermal functioning of the electrolysis plate in this case lies within the range of current density of 0 A·cm$^{-2}$ to 0.98 A·cm$^{-2}$, the overvoltages and ohmic losses Δelec do not produce enough heat, therefore for each mole of decomposed water a quantity of heat $Q_{allo}$ from an external source needs to be provided.

The electrolyser according to the present invention permits electrolysis with endothermal functioning under stable, homogeneous temperature conditions.

The electrolyser according to the present invention comprises a sealed enclosure in which electrolysis plates 100 and heating plates 10 are mounted in parallel, being inter-positioned; the enclosure comprises passages for supply to the electrolyser and collection of fluids from the electrolyser, and passages for circulation of heat-transfer fluid in the heating plates and for electrical connections of the electrolysis plates.

The enclosure is fabricated so that it is able to withstand high pressures in the order of several tens of bars. Advantageously, these pressures correspond to storage and transport pressures of the gas to be produced, so as to limit subsequent compression steps. These pressures lie for example between 20 bars and 130 bars, even higher.

The enclosure may be made in 800H steel for example or in Hastelloy with a determined thickness e.g. in the order of several centimeters. The thickness of the wall of the enclosure can be determined in relation to the pressure level in accordance with the Rules for Design and Construction of Materials.

Having regard to the simple shape of the electrolysis vessel, provision may be made to line the inner walls with one or more centimeters of silicon carbide (SiC) to protect the mechanical shell against phenomena of corrosion and to obtain slight lowering of the temperature of the mechanical wall. It is also possible to use coating techniques with refractory glass to protect the inner walls of the mechanical shell. Silicon carbide lining also contributes towards limiting heat losses of the equipment.

Figure 7A:
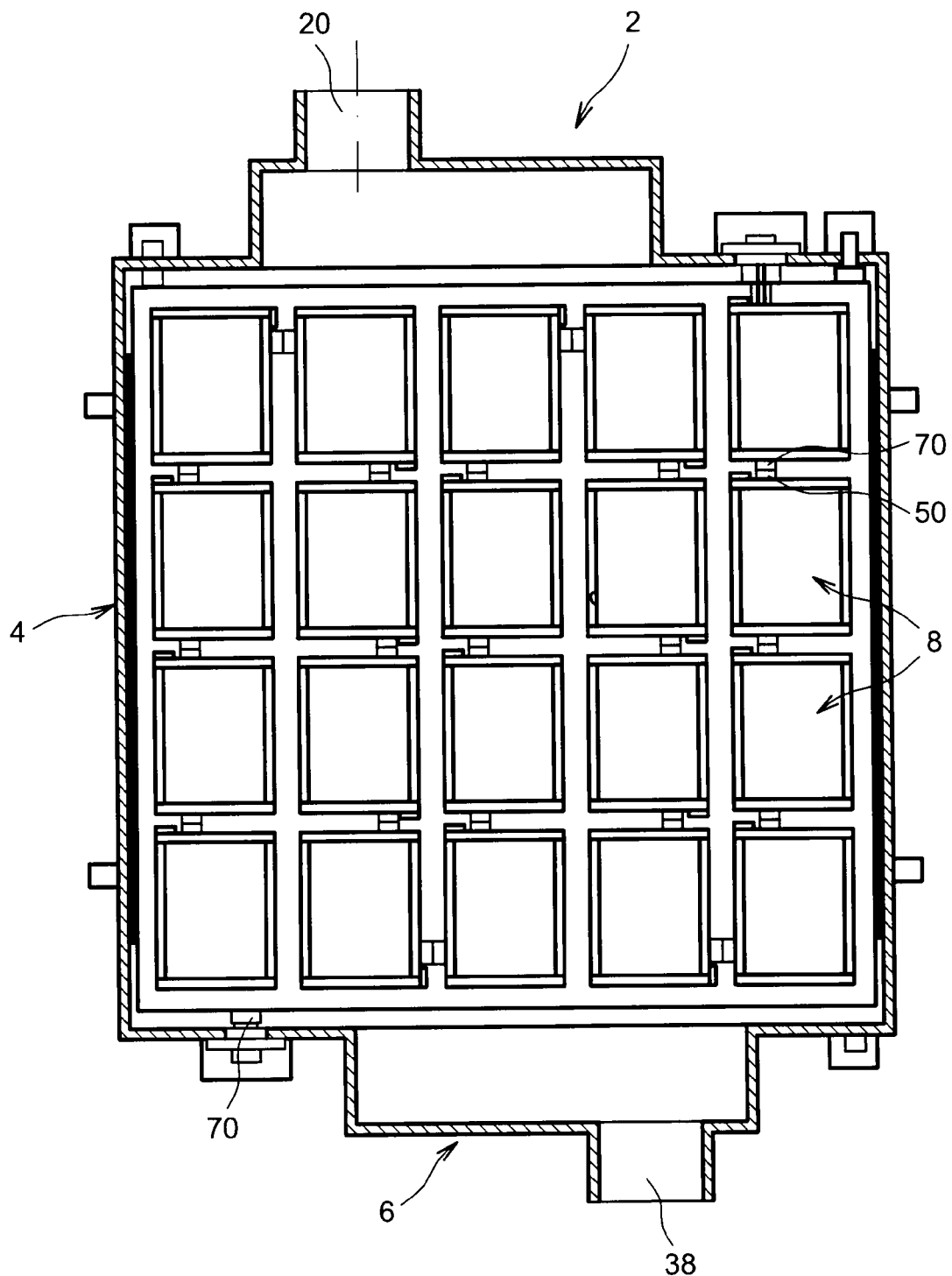
FIGS. 7A and 7B are cross-sectional views of an electrolyser according to the invention at an electrolysis plate.
Figure 7B:
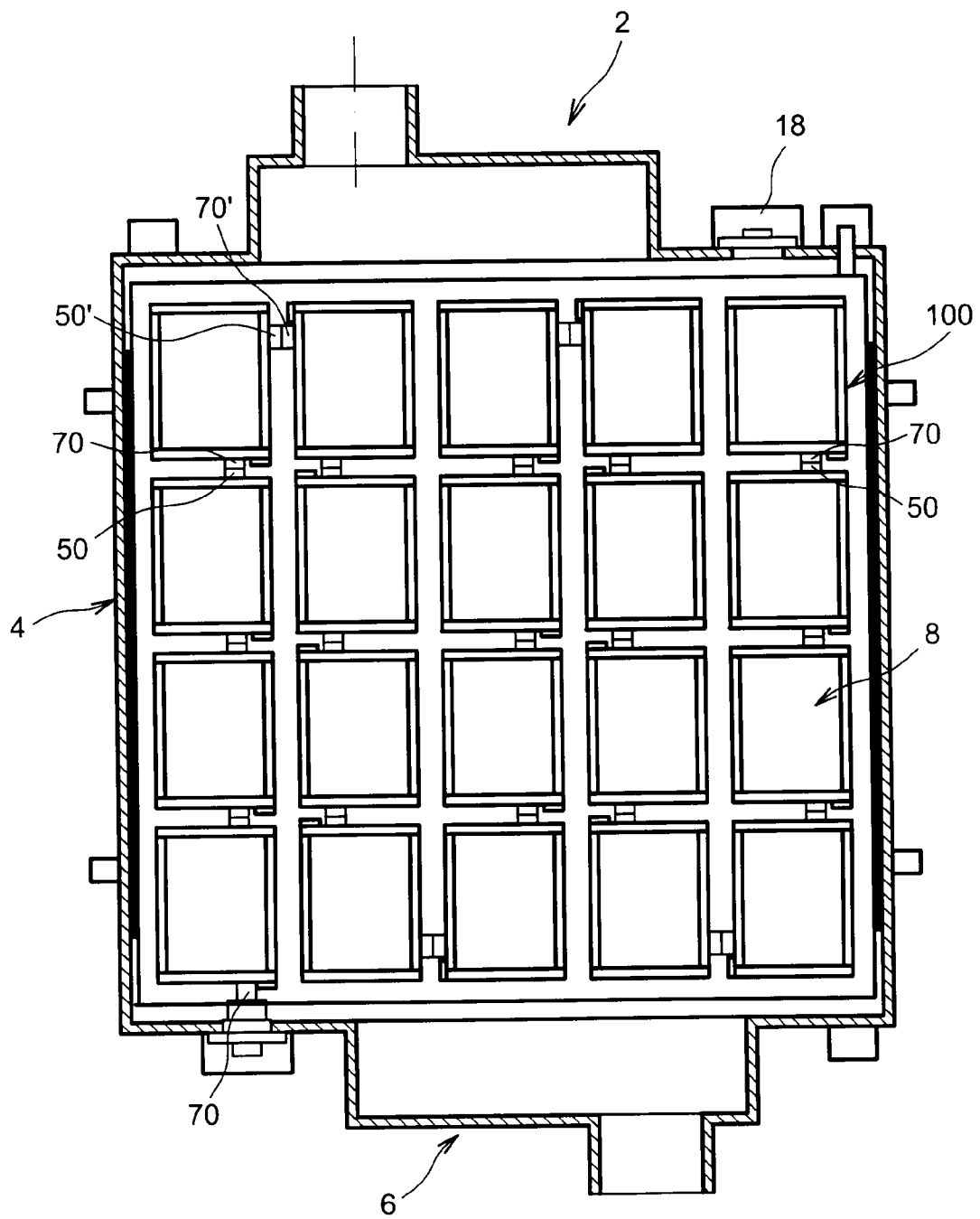

In FIGS. 7A and 7B a first embodiment of an electrolyser according to the invention is shown, seen in a cross-sectional view at an electrolysis plate whose individual parts are detailed FIGS. 1 to 6.

The electrolysis plate according to the present invention comprises a plurality of electrolysis cells 8 forming a matrix or mosaic mounted on a supporting frame 102.

In the remainder of the description, the electrolyser-exchanger shall be called an electrolyser for simplicity purposes.

As can be seen FIGS. 7A and 7B, the electrolyser comprises an upper chamber 2 forming a collection chamber for the dihydrogen $H_2$ that is produced, a median vessel 4 and a lower chamber 6 forming a water vapour supply chamber. These three parts can be welded together or assembled via flanges 7 to form a sealed metal enclosure whose shape is closely similar to a rectangular parallelepiped shape, mostly filled with water vapour under a pressure of several tens of bars.

According to the present invention, the electrolyser also comprises electrolysis cells 8 alternately arranged with heating plates 10 in the sealed enclosure.

Electric power is supplied to the electrolysis plates at the upper 2 and lower 6 chambers.

In the remainder of the description a detailed description is given of each of the components of the electrolyser.

The upper chamber 2 is in the shape of upturned box whose upper face 9 comprises a first recess 11 provided with a plurality of aligned openings 13 for passing of the ends of the heating plates, covered by a distribution duct for hot heat-transfer fluid 14 welded to the upper face 9.

The upper surface 9 comprises a second recess 12 provided with a plurality of openings 15 for passing of the oxygen collecting ends of the electrolysis plates 100, covered by a upper oxygen collection duct 16, this being welded or sealingly screwed (or mounted) on the upper face 9.

Advantageously, a cooling channel 18 to cool the upper electric connections is also welded or hermetically screwed in the second recess 12, covering a plurality of openings 19 for passing the anode or cathode pins of the supply plates.

The half-shell of the upper chamber 2 also comprises a main outlet duct 20 for the water vapour/hydrogen mixture formed in the electrolyser.

Figure 10:
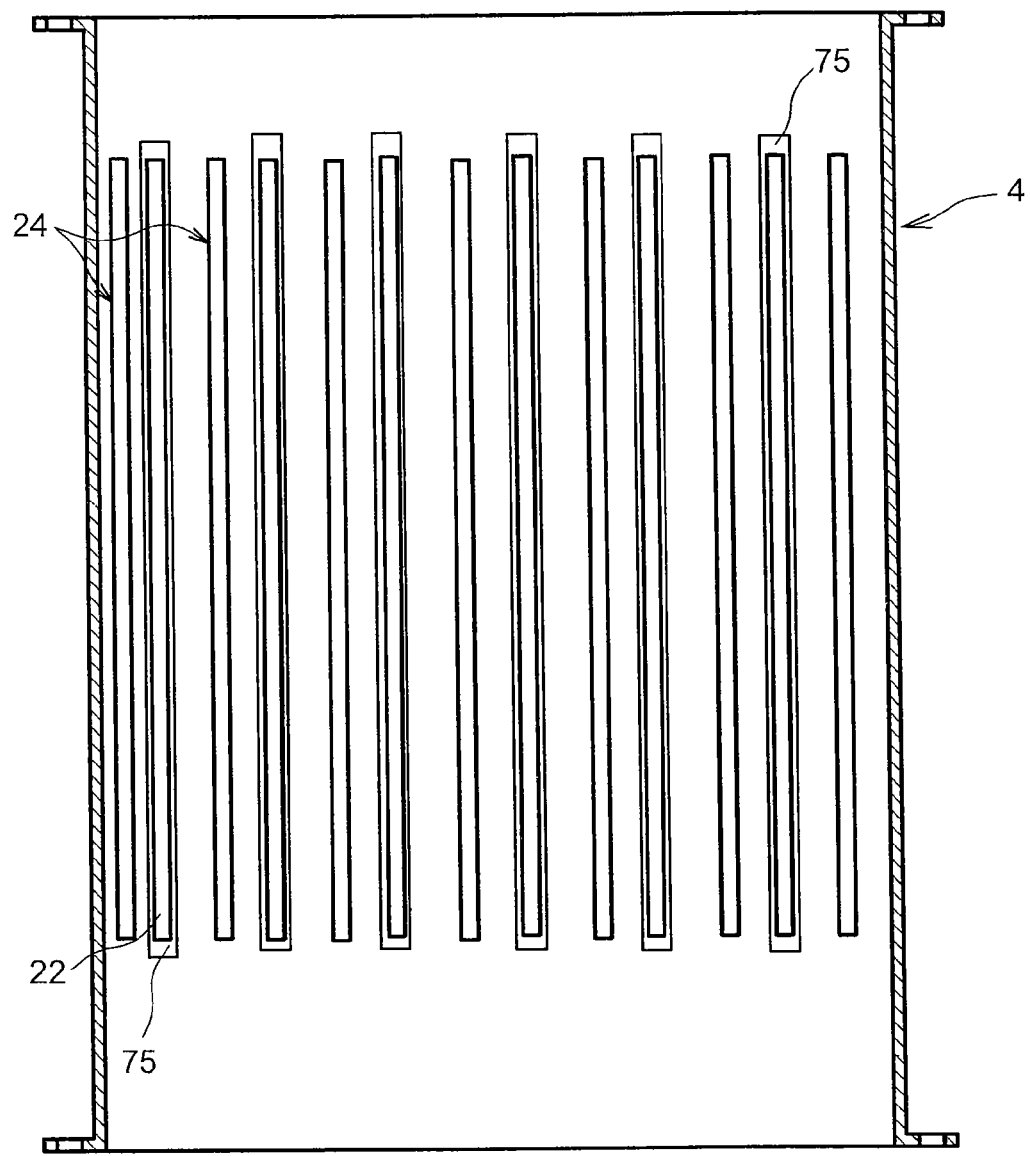
FIG. 10 is a front view of an inner face of a side wall of the electrolyser carrying slides intended to receive the side edges of the electrolysis plates and of the heating plates.

The median vessel 4 comprises a metal shell of open parallelepiped shape having side slides 22, 24 on two opposite faces as illustrated FIG. 10, in which the electrolysis plates 100 are alternately inserted with the heating plates 10 respectively.

The shape of lower chamber 6 is closely similar to that of the upper chamber 2. It is in the shape of open box whose lower face 26 also comprises a recess 28 provided with a series of openings 29 for passing the end-pieces for cold fluid collection, these openings 29 being covered by a collection duct 30 for the cold heat-transfer fluid which is welded to the recess 28, and another recess 32 comprising openings 33 for passing the oxygen collection end-pieces, covered by a lower oxygen collecting duct 34, welded to the recess 32.

Advantageously, a cooling channel 36 to cool the electrical connections is also provided above the openings 35 to pass the anode or cathode pins and is welded onto recess 32. The lower chamber 6 also comprises a main duct 38 for the supply of water vapour under pressure.

The electric connection of the electrolysis plates to the electric power source is made via metal braids located in the cooling channels 18, 36, permitting very good electric conductivity of the metal conductors to be obtained. In addition, the electric connections are advantageously made outside the electrolyser and are therefore not subjected to the high temperature inside the electrolyser.

We will now describe an electrolysis cell 8 according to the invention, this cell comprising a central body 8.1 and an external casing 8.2.

Generally, the central body 8.1 according to the invention is stratified i.e. it is formed by superimposed layers. These layers can be clearly seen in the longitudinal section view of an electrolysis cell shown FIG. 4.

The central body 8.1 according to the invention comprises a rigid core 40, coated with an anode 42 on its two main faces, an electrolyte 44 coating the anode and a cathode 46 coating the electrolyte 44.

To conduct the current, the core 40 is advantageously metallic or high density ceramic in the same material as the anode so as to have expansion properties close to those of the anode. It is of substantially rectangular shape a few millimeters thick and, at one longitudinal end, comprises a thicker head e.g. thickness in the order of one centimeter to which an anode pin 50 is joined, the anode pin 50 being intended to connect the anode 42 to the electricity supply.

The core 40 advantageously comprises means 52 to drain the oxygen generated at the anode 42. These drainage means 52, in the illustrated example, are formed of grooves 54 made in each face of the core and reservoirs 56, as can be seen FIG. 2A. The reservoirs consist of intermediate reservoirs 56.1 collecting the oxygen at different points of the anode, and of a main reservoir 56.2 connected to all the intermediate reservoirs 56.1 via the grooves 54 and directly connected to an oxygen manifold 62.

The grooves 54 and reservoirs 56.1, 56.2 are advantageously filled with a porous, good electrically conductive material e.g. a metal foam 57 to allow both the passing of oxygen and the depositing of the anode-forming layer on the faces of the metal core.

The grooves 54 are made on the faces of the core 40 ensuring efficient, uniform oxygen collection. These grooves are of variable dimensions in relation to their length and positioning on the plate.

Figure 4:
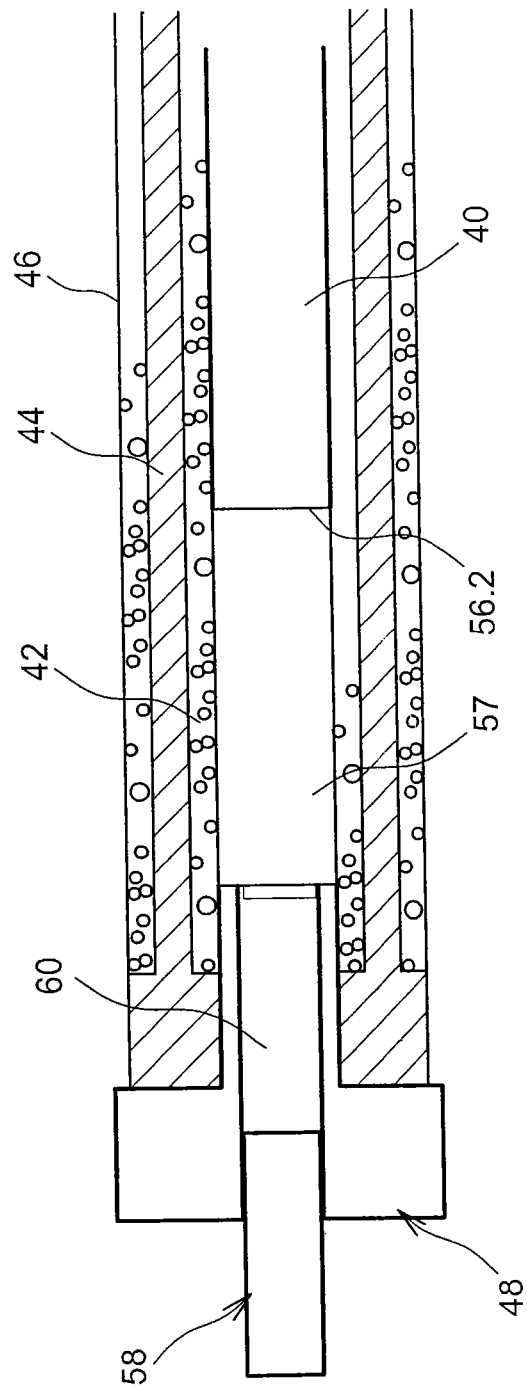
FIG. 4 is a longitudinal section view of the central body of the electrolysis cell in FIGS. 2A et 2B.

The main reservoir 56.2, as can be seen FIG. 4, is formed by a through cut-out filled with metallic foam. It is connected to a nozzle tip 58 of an oxygen collecting end-piece via a bore 60 bored longitudinally in the metallic core 40.

Figure 1A:
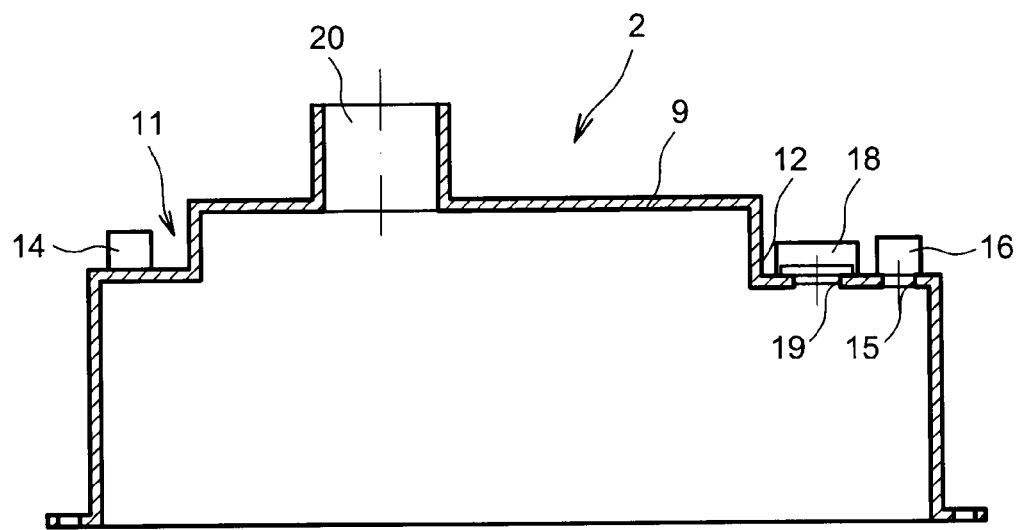
FIG. 1A is a schematic view of a collection chamber for generated hydrogen and supply of hot heat-transfer fluid, in an electrolyser according to a first embodiment of an electrolyser according to the invention.
Figure 1B:
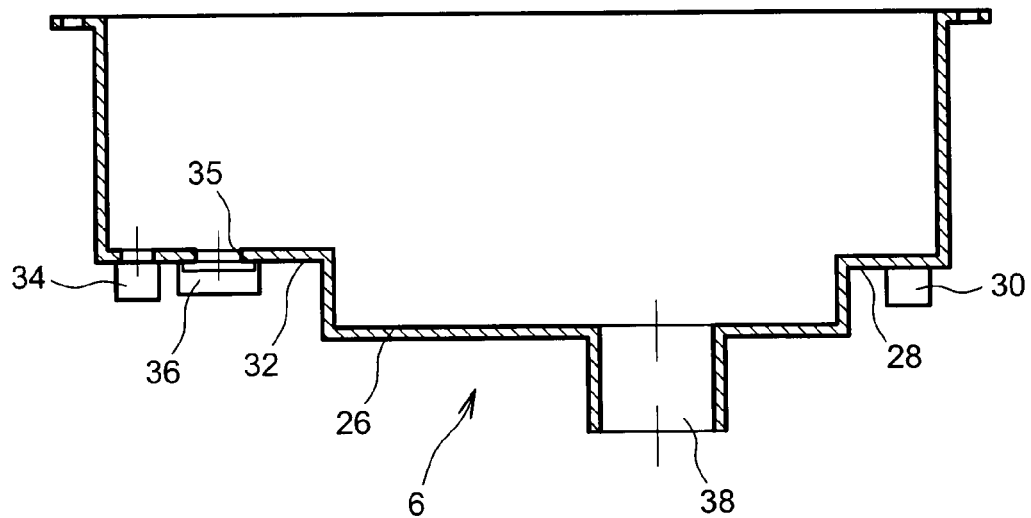
FIG. 1B is a schematic illustration of a chamber for the supply of active fluid and collection of cold heat-transfer fluid in an electrolyser according to a first embodiment of an electrolyser according to the invention.
Figure 2A:
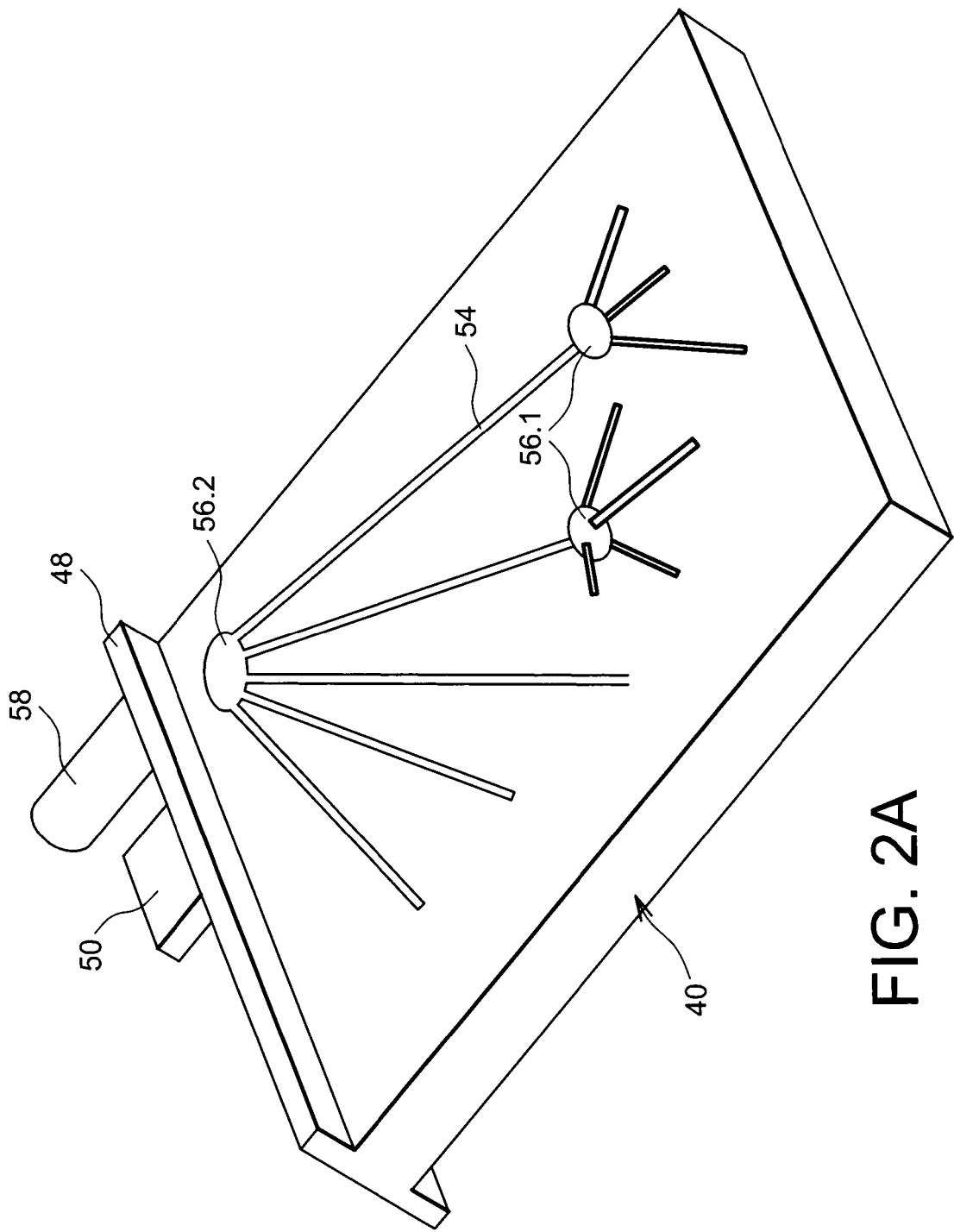
FIGS. 2A and 2B are perspective views of a central body of an electrolysis cell in intermediate states of embodiment according to the present invention.
Figure 2B:
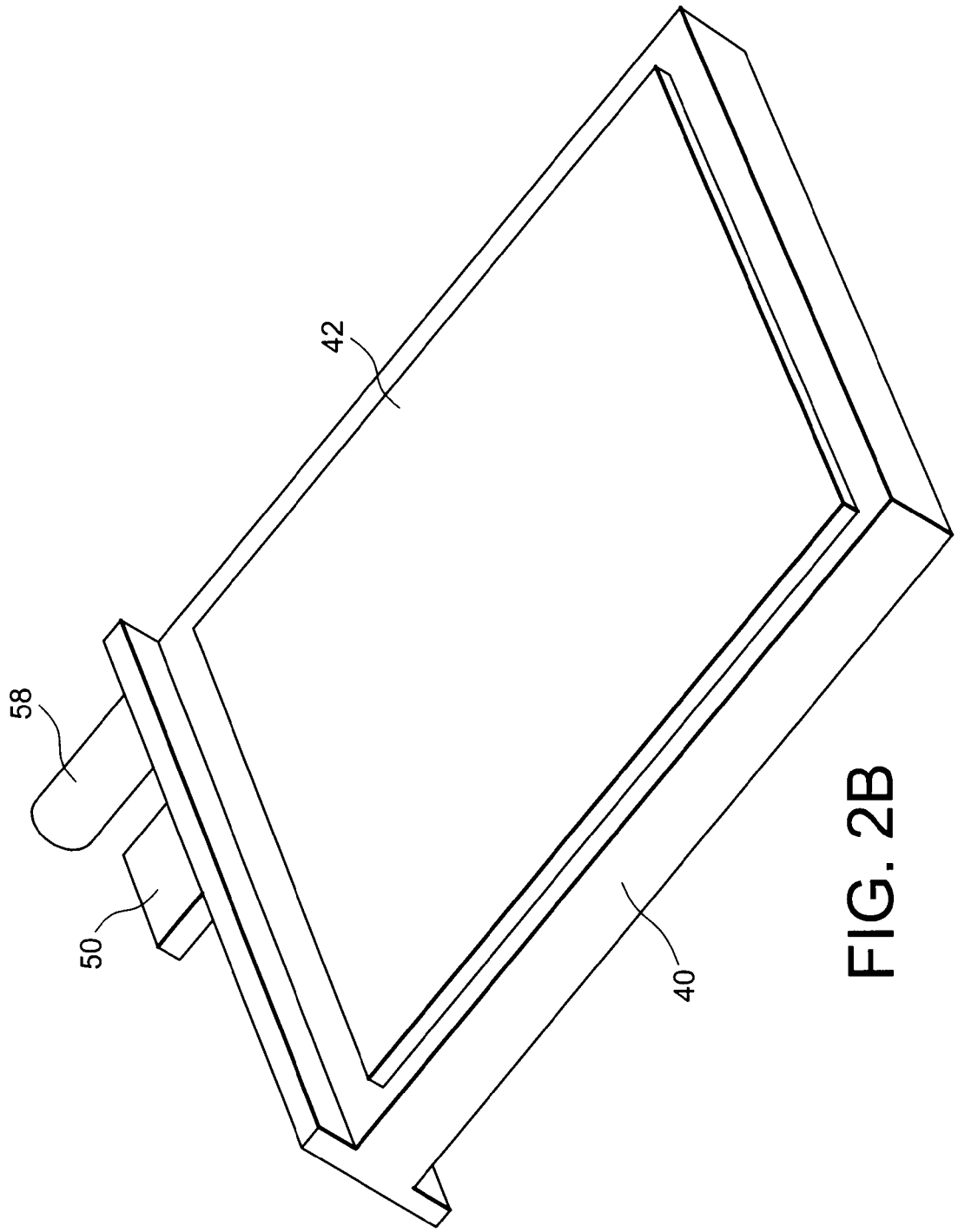

The anode 42 is of porous ceramic anode type, electrically highly conductive, in strontium-doped lanthanum manganite for example or equivalent material. It is deposited as a thin layer in the order of one tenth of a millimeter on the metallic core. In FIG. 2B, the metallic core 40 can be seen coated with the anode 42.

The electrolyte 44 is leak-proof, electrically insulating and a good ion conductor, made in stabilized zirconium for example deposited in a very thin layer, for example in the order of 40 μm, on the anode 42. The electrolyte is deposited in a thicker layer on the part of the metallic core 40 that is not coated with the anode, to form a continuous planar surface.

The cathode 46 is in metal ceramic for example, nickel or stabilized zirconium. It is deposited in a thin layer in the order of one tenth of a millimeter on the electrolyte 44.

As indicated previously, the electrolysis cell 8 comprises a metal end-piece 58 which connects with the main reservoir 56.2. This end-piece 58, in the illustrated example, is directly brazed onto the head of the core 40.

Figure 3:
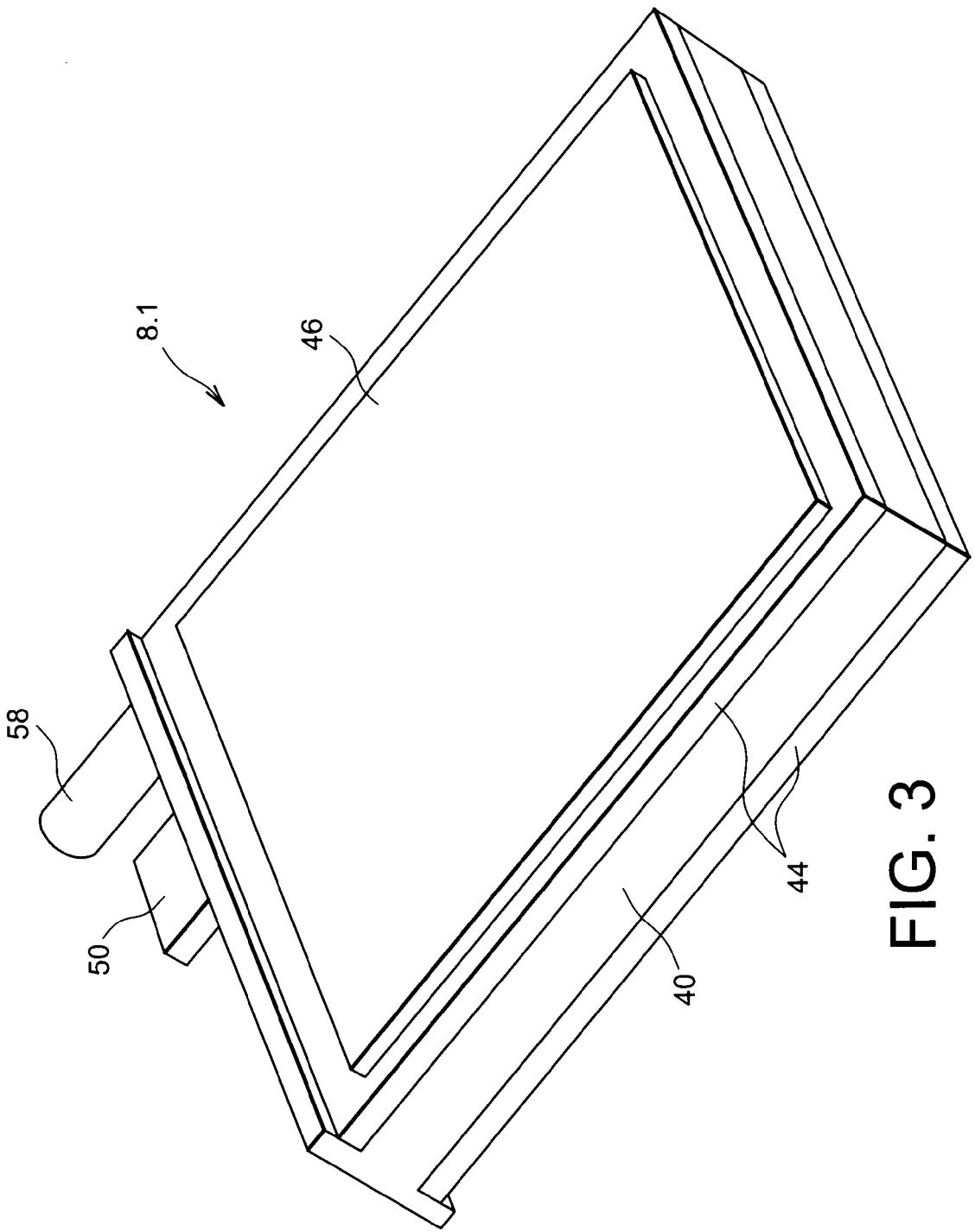
FIG. 3 is a perspective view of the complete central body of the electrolysis cell.

In FIG. 3, the complete central body 8.1 of the complete electrolysis cell can be seen.

Figure 5:
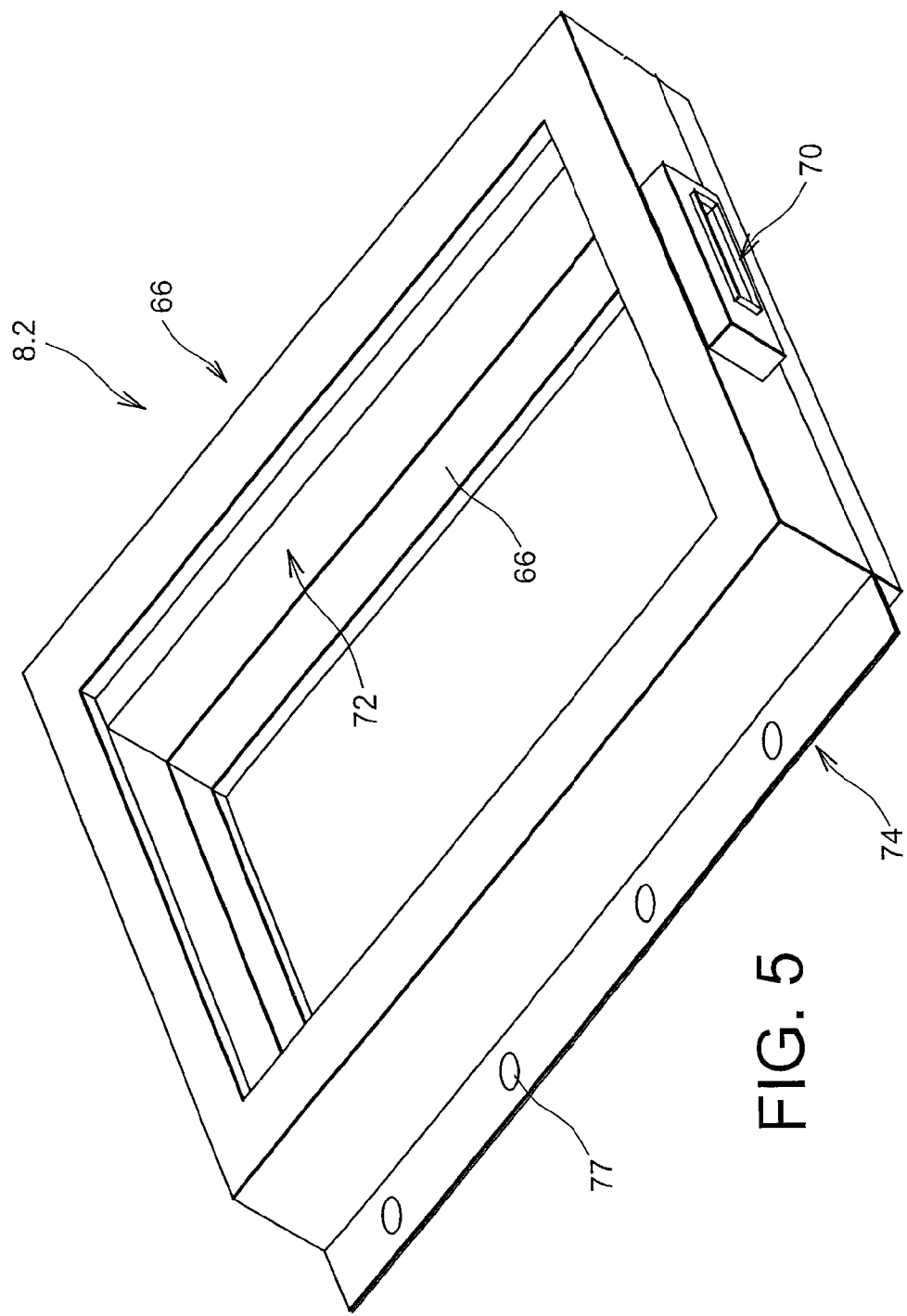
FIG. 5 is a perspective view of a frame intended to surround the central body shown FIG. 3.

In FIG. 5, the external frame-shaped casing 8.2 can be seen comprising two metallic semi-frames 66 intended to lay either side of the central body 8.1 and of a closing/clamping system 68 to compress the central body 8.1 between the two semi-frames 66. The compression achieved takes part in the rigidity of the electrolysis cell.

Also, the casing 8.2 is electrically conductive e.g. in metal to ensure the electric connection continuously between the cathode 46 and a cathode female tap 70 carried by the casing 8.2. The cathode female tap 70 is provided axially opposite the anode pin 50. An electric insulation gasket 72 is provided between the head of the metallic core 40 and the casing 8.2 and between the flanks of the central body 8.1 and the metallic frame 8.2. The use of the casing 8.2 to connect the cathode to the cathode female tap 70 avoids having recourse to connection cables.

The clamping means are of screw-nut type for example mounted in side flanges 74 of the semi-shells 66, these flanges also being used to fix the cell to the supporting frame. An electric insulator 77 is arranged between each screw and borehole receiving the screw.

The slides 22 are provided with electric insulating means 75 to insulate the cathodes from the vessel and prevent short-circuiting.

It is to be noted that the high pressure of the water vapour contributes towards pressing the different layers forming the central body 8.1 of the electrolysis cell very closely together, and continuously, which ensures good operational performance of the electrolysis cells 8.

The pressure of the water vapour/hydrogen mixture being much higher than the pressure of the oxygen collected by the drainage means, the higher the pressure of the water vapour/hydrogen mixture contained in the electrolysis enclosure, the more the cathode 46 is pressed strongly and continuously against the electrolyte 44, the electrolyte 44 against the anode 42 and the anode 42 against the metallic core 40, and hence the better the electric contacts between these different parts. This therefore promotes the obtaining of high, time-constant performance levels for this type of electrolyser. Taking the expression of the voltage to be applied to the terminals of the electrolysis cell, the irreversibility term consists of an ohmic drop term and an activating overvoltage term $\Sigma\eta$. However at temperatures higher than 800° C. at which the electrolyser of the present invention operates, the water decomposition reaction is activated by temperature, it therefore only requires a very low activating overvoltage $\Sigma\eta$, the total voltage at the terminals of the electrolysis cell is therefore substantially reduced to the sum of the voltage at zero current and ohmic drop, which varies linearly with current density. Therefore, through coating of the electrolyte 44 on the anode 42 and of the anode 42 on the metallic core, the ohmic drop term is reduced, and the irreversibility term is therefore reduced, which allows operation at high endothermism. The reduction of ohmic losses is also obtained through the use of a plurality of small electrolysis cells mounted in series and arranged at a short distance from each other to reduce the length of the electrical connections, and also by maintaining the strong intensity electric lines outside the enclosure so that they are kept at a low temperature.

The present invention also has the advantage of simplifying the sealing between the oxygen ducts and the hydrogen-containing ducts and of making them more efficient. By maintaining a sufficient water vapour flow rate relative to the flow rate of the formed hydrogen, and by obtaining a homogeneous water vapour/hydrogen mixture, the seals are subjected at the electrolysis cells to the external overpressure of the homogeneous mixture of hydrogen-containing water vapour and not to an internal overpressure, sealing is therefore easier to achieve. The electrolyser therefore has an increased lifetime.

The electrolysis cells are preferably of small size. By way of example, the cathode may be of square shape with sides measuring 5 cm.

A description will now be given of a mosaic or matrix assembly of electrolysis cells to form a composite electrolysis plate 100.

According to the present invention, provision is made to mount the elementary cells on a supporting frame 102 so as to form a mosaic or matrix, the cells 8 are therefore arranged in rows and columns.

In FIGS. 7A and 7B, an embodiment can be seen with two adjacent electrolysis plates 100.1, 100.2 in which the electrolysis cells 8 are mounted in series.

Plate 100.1 is connected in series with plate 100.2.

In this example of embodiment, the column cells are connected in series, the columns themselves being connected in series.

As can be seen FIGS. 7A and 7B, all the cells are substantially identical, however the cells at the start and end of the columns differ from the other cells in that the anode pins 50' or cathode pins 70' are provided laterally to allow electric connection to a cell in an adjacent column.

As described above, the cells other than the end cells comprise an anode pin 50 extending axially to outside the casing 8.2 and a cathode female tap 70.

The cathode pin 70' of plate 100.1 (FIG. 7A) is electrically connected to the anode pin 50 of plate 100.2 (FIG. 7B).

Figure 11A:
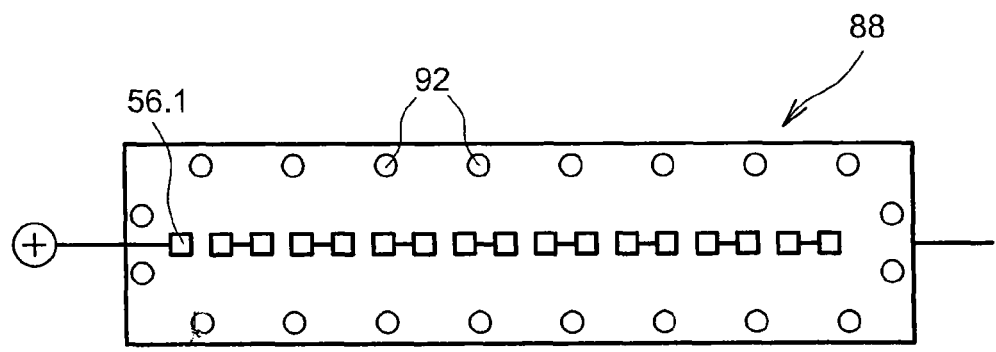
FIGS. 11A to 11C are respectively underside, longitudinal section and overhead views of a connection plate for connection onto the upper chamber.
Figure 11B:
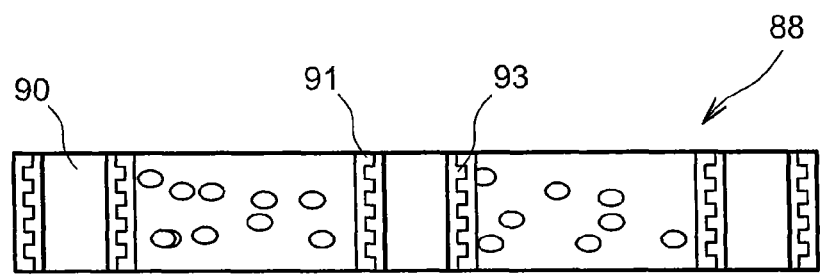
Figure 11C:
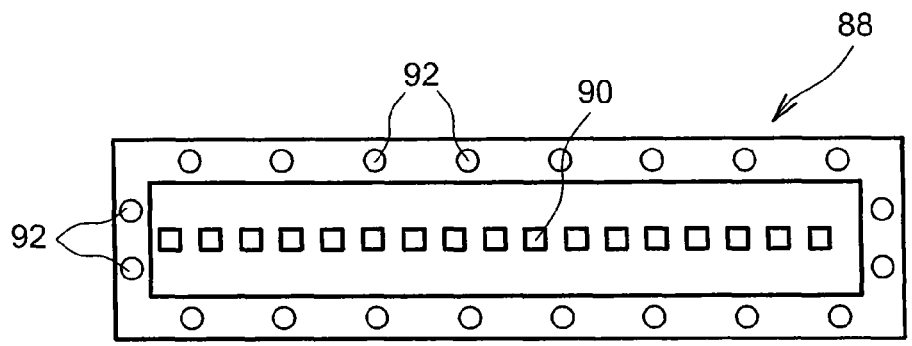

Provision is also made to have one or more connection plates 88 (depending on the length of the electrolyser) shown FIGS. 11A to 11C through which the anode pins 50 and cathode female taps 70 are passed.

Each plate 88 comprises a series of aligned boreholes 90 to pass the anode pins 50 and cathode pins 70'. Also, the plate 88 on its periphery comprises boreholes 92 to pass clamping dowels for its fixing onto chamber 2 or 6.

This or these connection plates 88 and their sealing gasket and electric insulation (not shown in the figures) ensure the seal of the electrolysis vessel and electrical insulation of the anode and cathode connections with respect to the electrolysis vessel.

Several techniques are possible, depending on the mode of electric connection of the electrolysis support plates, to ensure the two functions of sealing and electrical connection for the anodes and cathodes.

With regard to the two connection modes in parallel corresponding to the second and third connection modes described below, the anode pins of one connection plate are at the same electric potential, they can therefore be directly brazed in the boreholes of plate 88 which, in this case, is in steel. In these two cases, the electric connection plate is insulated from the electrolysis vessel by an electric insulation gasket.

With mounting in series, the anode pins and/or cathode pins not connected by the electric supply cable of one same plate are electrically insulated from each other, the use of several techniques is possible: the first is to use a plate 88 in high density ceramic with tapped threads in which a metal sleeve 91 is to be screwed and its sealing gasket 93 (FIG. 11B), after installing the connection plate 88 on the upper chamber 2 or lower chamber 6, the anode pins and/or cathode pins are then brazed in their metal sleeve.

Figure 11D:
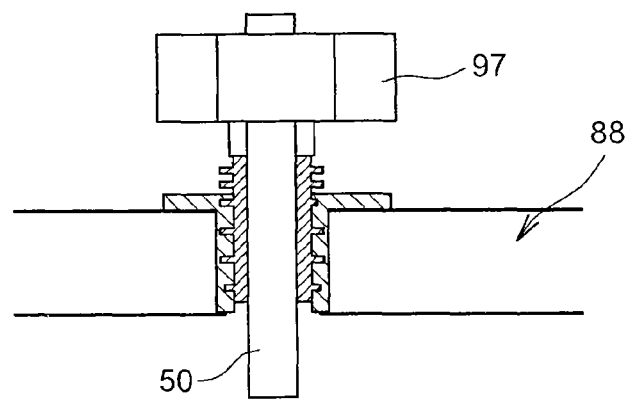
FIG. 11D is an example of connection of the anode and/or cathode pins without connection plates.
Figure 12:
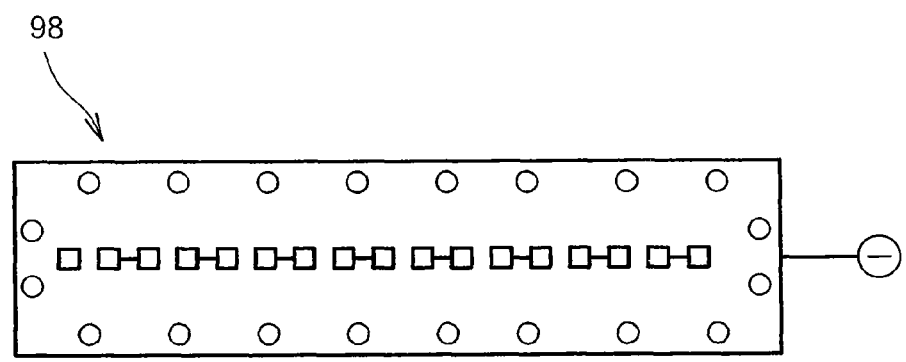
FIG. 12 is an underside view of a connection plate mounted on the lower chamber.

The second technique (FIG. 11D) consists of using the sealing technique for cable passageways using a seating in ceramic material or metal material with electrically insulating ceramic deposit (e.g. in zirconium) used to insulate the anode pin 50 or cathode female tap 70, which in this case are of cylindrical shape, the plate 88 may be in steel or can be welded or screwed with a metal seal onto the upper chamber 2 or lower chamber 6. In this latter case, it is possible not to use any connection plate 88, the cylindrical anode pins and cathode pins 50 and 70 being directly mounted on the chambers 2 or 6. The metal bolt 97, shown before clamping in FIG. 11D, is screwed onto the seating and compresses the O-ring thereby achieving a seal.

In FIG. 11C, the plate 88 can be seen with the connection in series of the electrolysis plates.

The anode pin 50.1 of the first electrolysis plate 8 is connected to the electric supply (not shown), the cathode pin 70.1' of the second electrolysis plate 8 is connected to the anode pin 50.1 and so on.

Part of the cabling can be made inside the vessel to reduce inlets and seals.

The pins 50, 70' are brazed in their housing, the flow ducts 14, 30 for the heat-transfer fluid are seamed or brazed to form distributing and collecting channels, as are the oxygen ducts 16, 34.

Figure 13:
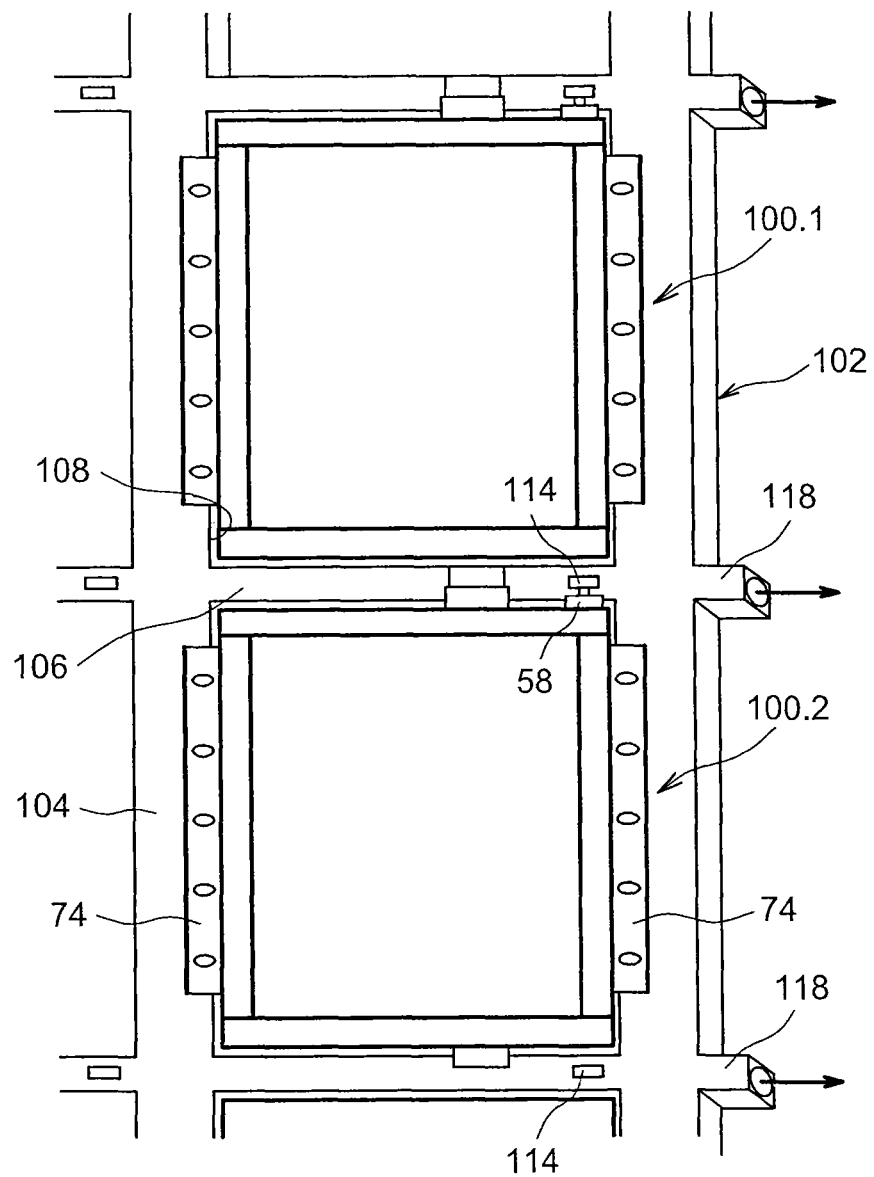
FIG. 13 shows details of an electrolysis plate.

In FIG. 13, a detail can be seen of an electrolysis plate according to the present invention.

The elementary cells are mounted in a supporting frame 102 comprising vertical uprights 104 and horizontal uprights 106 delimiting windows 108 of rectangular shape, of substantially the same size as the electrolysis cells 8.

The cells 8 are fixed onto the vertical uprights in the illustrated example, by means of flanges 74 via seatings screwed into the frame, e.g. in ceramic or ceramic-coated steel in which screws are screwed which pass through the cell flanges.

An electric insulator is inserted between the uprights 104, 106 and the flanges 74, to insulate the cathode 46 from the supporting frame.

When mounting the cells 78, these are placed closed to the supporting frame so that the anode pin 50 of the cell drawn close enters into the cathode female tap 70. On the other hand, the cells at the start and end of a column comprising a lateral cathode 70' are mounted horizontally on the supporting frame 102.

As illustrated, it is particularly advantageous to have electrolysis cells in the shape of a square slab of small size so that they can be easily arranged on the supporting frame, in particular for the cells at the start and end of a column.

In one particularly advantageous embodiment of an electrolysis plate according to the invention, provision is made to use the supporting frame 102 as duct for oxygen collection.

For this purpose, the horizontal 106 and vertical 108 uprights are hollow and the end-pieces 58 for oxygen collection are connected to these uprights 106.

Figure 14:
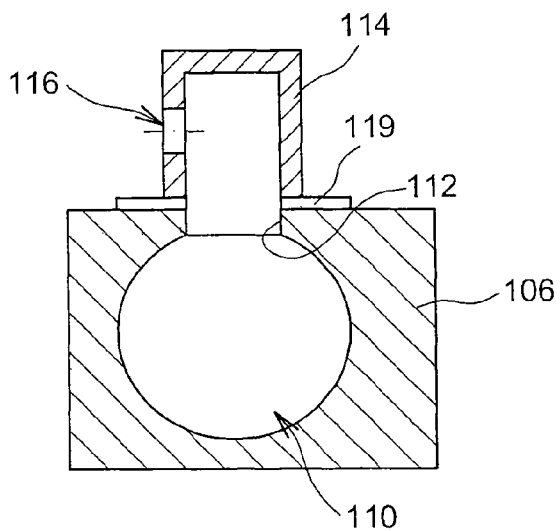
FIG. 14 is a longitudinal section view of an upright of the supporting frame of the plate shown FIG. 13.

In FIG. 14, a cross-sectional view is given of a hollow upright 106 provided with a connector 114 to an electrolysis cell 8.

The upright 106 comprises a longitudinal channel 110 and a side bore-hole 112 opening into the connector 114 added onto the upright 106.

This connector itself comprises a connecting bore-hole 116 to pass the oxygen-collecting end-piece 58. An electrically insulating seal 119 is arranged between the connector 114 and the upright 106 to insulate the anode from the frame 102.

When mounting a cell 8 on the supporting frame, the oxygen-collecting end-piece is inserted in the bore-hole 116 of the connector 114 then brazed to seal the connection.

To simplify assembly, the end cells comprise a lateral oxygen-collecting end-piece parallel to the anode or cathode pin, which is connected to a connector fixed to a vertical upright 104.

The upper horizontal bar of the supporting frame 102 comprises one or more outlet end-pieces 118 for the oxygen collected in the supporting frame passing through the upper chamber (FIGS. 7A and 7B).

In this way simple means are provided to collect oxygen produced at the anodes and its evacuation to outside the electrolyser.

Advantageously, provision is made so that the lower semi-frame of the casing of all the cells is shallower than the upper semi-frame to facilitate mounting of the cell on the supporting frame.

The supporting frame is in metal for example, possibly being forged with solid bars, then the horizontal 106 and vertical 104 uprights are bored to form a network of intercommunicating channels. Closing profiles are then welded onto the four sides of the supporting frame to seal the supporting frame.

The side profiles carry metal guides 120 intended to be mounted in the side slides 22 of the median vessel 4.

The mounting in series of the electrolysis cells 8 of a plate 100 allows circulation in the cells and contactors of a low intensity current corresponding to the supply to a single cell (10 A for a column consisting of tens of double-sided cells 0.05 m by 0.05 m with a current density of 2000 A/m2), which considerably limits the electric power dissipated in the form of heat in the anodes, cathodes and at their contactor.

Figure 8A:
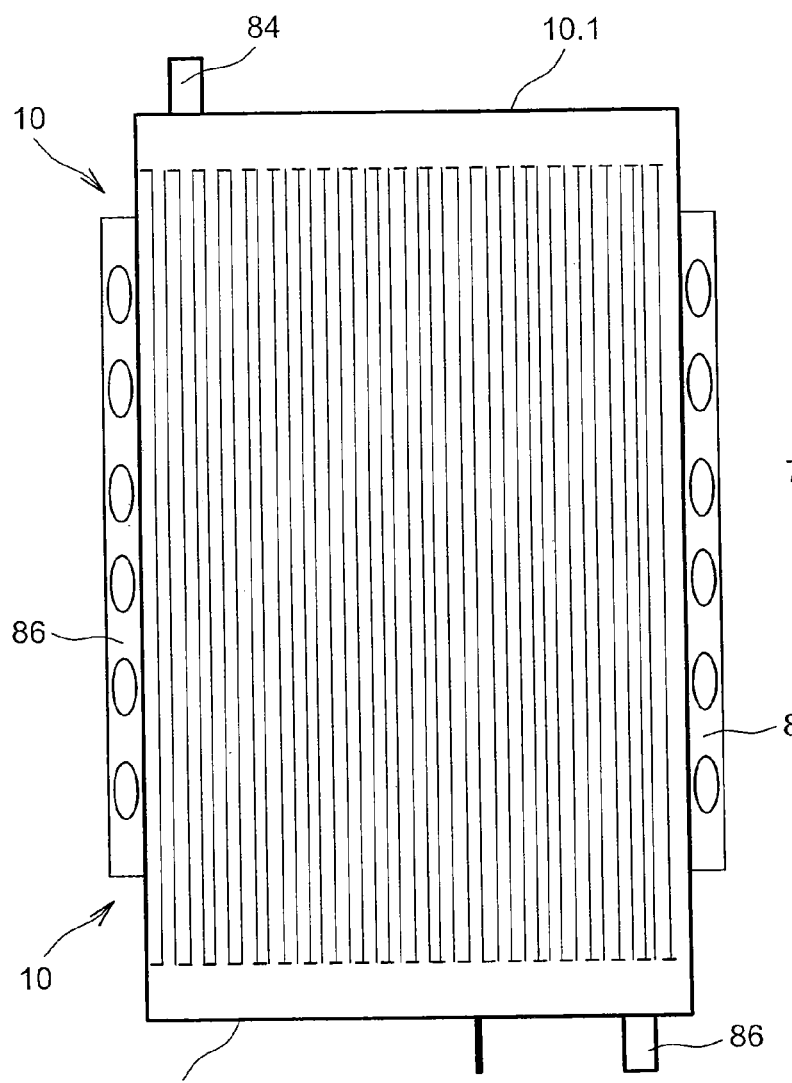
FIGS. 8A to 8C are respectively front, cross-sectional and longitudinal section views of a heating plate for an electrolyser according to the present invention, the inside of the heating plate being shown FIG. 8A.
Figure 8C:
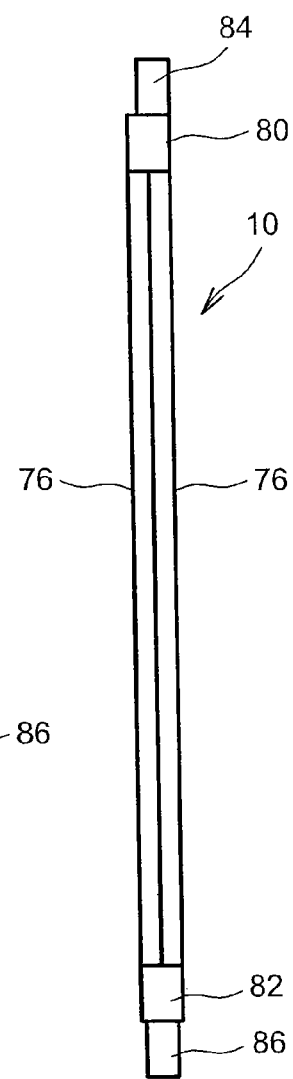
Figure 8B:
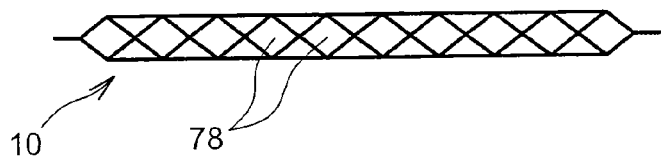

A heating plate 10 according to the invention will now be described as illustrated FIGS. 8A to 8C. The heating plate comprises two metal sheets 76, for example in 800 H steel or Hastelloy and welded around their entire periphery.

Between the two metal sheets 76, a heat exchange body 78 is arranged comprising one or several hundred channels extending longitudinally between an upper end 10.1 and a lower end 10.2.

An inlet manifold 80 for the hot heat-transfer fluid is provided at the upper end and a discharge manifold 82 for cold heat-transfer fluid is provided at the lower end 8.2.

End-pieces 84, 86 are provided on the inlet manifolds 80 and discharge manifolds 82, advantageously these end-pieces 84, 86 are metallic and brazed onto the manifolds 80, 82.

Also two guides 86 are provided on the sides of the heating plates 10 which enter into the slides 24 of the median vessel 4.

The heat-transfer fluid circulating in the heating plates is advantageously a gas under slightly lower pressure than the pressure of the electrolytic bath, helium for example.

Reference will firstly be made to FIG. 7A.

The lower chamber 6 is fixed to the median vessel 4. The electrolysis plate 100 is then inserted in the median vessel 4 by causing its flanges 74 to slide in the slides 22.

The cathode female tap 70 enters into the opening 35 made for this purpose in the lower chamber 6, in the cooling channel 36.

Figure 9:
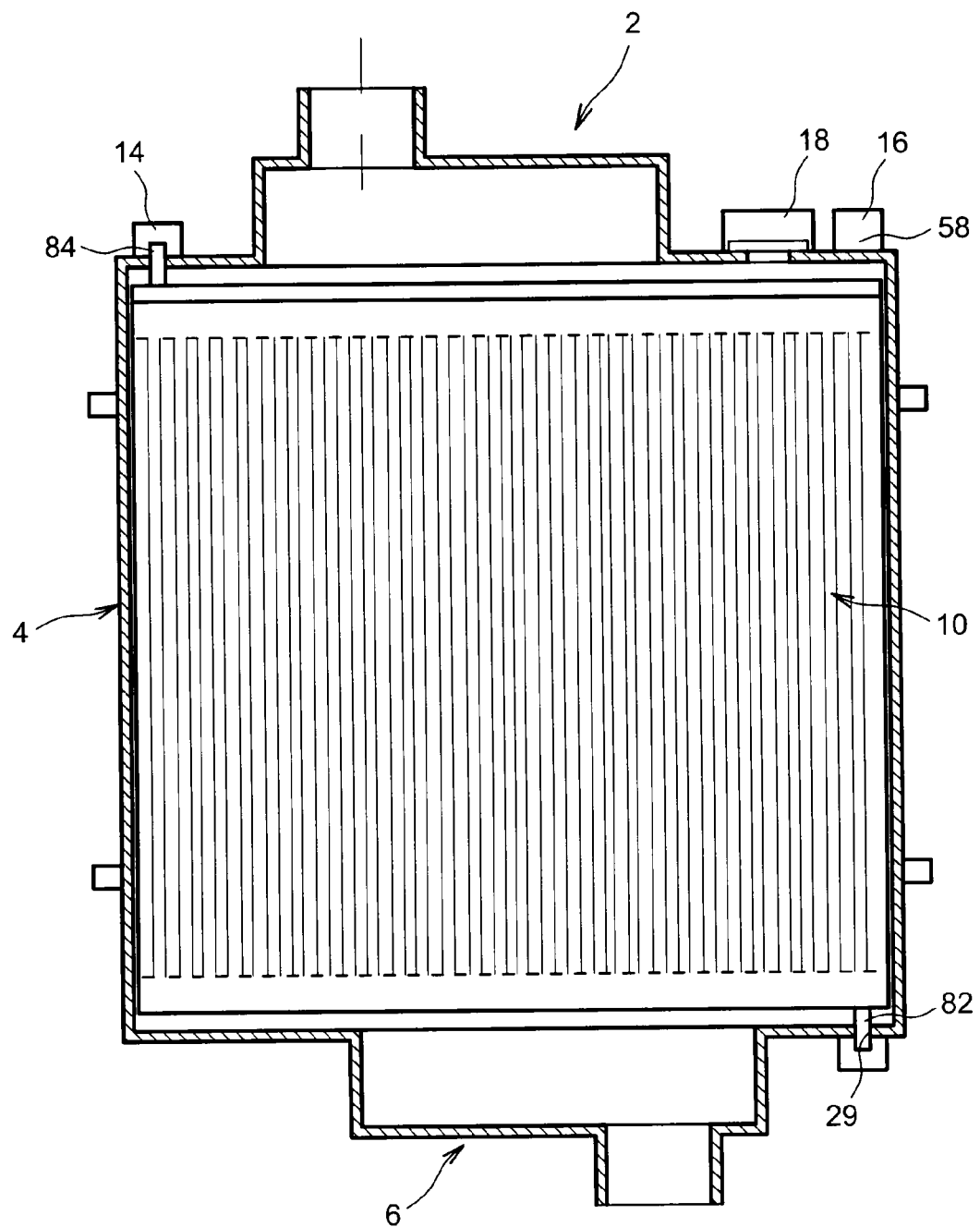
FIG. 9 is a cross-sectional view of an electrolyser according to the invention at a heating plate.

A heating plate 10 is then inserted in adjacent slides 24 as can be seen FIG. 9, the outlet end-piece 86 for the cold heat-transfer fluid passes through opening 29 provided in the lower chamber 6.

Next, another electrolysis plate 100 is placed in the median vessel 4, this time so that the anode pin 50 passes through an opening 35 as illustrated FIG. 7B.

Next, another heating plate 10 is added adjacently in the same manner as for the preceding heating plate, and so on until the vessel is filled.

The upper chamber 2 is then arranged on the median vessel 4 so that the anode pins 50 and cathode female taps 70 pass through openings 19, the oxygen-collecting end-pieces 58 pass through openings 15 and the end-pieces 84 supplying hot heat-transfer fluid pass through openings 13.

The upper chamber 2 is then sealingly bolted onto the median vessel 4.

The inlet end-pieces 84 are brazed onto the upper face of the recess 11 of the upper chamber, they are therefore made to connect with the hot heat-transfer fluid-channel. Brazing avoids having recourse to additional sealing means, and the lifetime of the electrolyser is therefore increased.

The hot heat-transfer fluid duct 14 is connected to a hot heat-transfer fluid source, the oxygen-collection duct 16 is connected to an oxygen storage reservoir, the main duct is connected to a reservoir collecting the water/hydrogen mixture.

The anode pins 50 and cathode female taps 70 emerging from the upper chamber 2 are connected as shown FIG. 11, the cooling channel 18 being omitted. This electric connection allows mounting in series of the electrolysis cells 8.

The recesses in the upper 2 and lower 6 chambers have the advantage of reducing the length of the anode and cathode pins and thereby of reducing losses through Joule effect.

The connection plates 88, 98 provided with their gasket 89 are caused to slide along the pins 50, 70 of the electrolysis plates and are then screwed onto the upper and lower chambers.

The pins 50, 70 are brazed in their housing, the heat-transfer fluid flow ducts 14, 30 are seamed or brazed to form the distributing and collecting channels, as are the oxygen ducts 16, 34.

The circulating channels for the hot and cold heat-transfer fluid, oxygen evacuating channels and cooling channels for the electric contactors cooling channels are mounted in their respective duct.

For a current density of 2000 A/m$^2$ and double-sided square cells with sides of 0.05 m, the current intensity passing through the different junctions is only 10 A, which has the advantage of permitting a reduction in losses at the metallic core 40, and the anode, electrolyte and cathode deposits. Additionally, the forming of a rigid, sealed cell is simplified by its reduced size.

With the present invention and with the use of a large number of elementary cells of small size mounted in series, it is possible to limit the electric power dissipated in the form of heat and to limit the intensity of the electric current passing through the different cells of the electrolyser, and notably the numerous metal connections between the electrolysis cells.

If n elementary cells of cathode surface s are considered, mounted in series, the current intensity I passing through all the cells is equal to the intensity I needed to supply a single cell:

i.e. I=s*j in which j is the value of current density.

Let r be the value of the resistance of one cell and its contactors, the equivalent resistance of all the cells mounted in series is then R=n*r and dissipated power is $Q=n*r*(j*S)^2$.

If it is desired, at constant current density, to produce an electrolyser having the same production capacity as the n cells but with k times fewer cells, the cathode surface of each cell must be multiplied by k and the electric power dissipated as heat in this configuration is then:

$$Q1=(n/k)*r*(j*k*s)^2=k*Q.$$

That is to say that the electric power dissipated as heat is multiplied by k.

Therefore for a current of 4 kA, which only corresponds to a hydrogen production of 0.021 mol/s, corresponding to a double-sided plate of 1 m*1 m with a current density of 2 kA/m2 and a cermet with resistivity of $1*10^{-3}$ Ω*cm, the loss of potential for a conductor element 1 cm in length and cross-section of 1 cm² is 4 V and the electric power lost as heat in the connector is 16 kW; this figure is to be compared with the value of endothermism power at 900° C. for a production of 1 mol/s i.e. 42 kW. Whereas, with the invention, by forming this electrolyser section with 400 square cells with sides of 5 cm and 400 connectors as above, (1 cm in length and cross-section of 1 cm²) the same value of voltage loss for all the cells is obtained, but the lost electric power is only 40 W.

Additionally, by functioning under high pressure, a reduction in the electricity consumption of the factory is obtained by reducing the installations required for compression of the gas leaving the electrolyser for its storage and transport, since the outgoing gas can be at a pressure substantially close to the pressure for storage and transport. Also, the compactness of the installation is improved.

Additionally, head losses are reduced as already explained.

The heat-transfer fluid and the water vapour/hydrogen mixture can flow in co-current direction, the inlet for the hot heat-transfer fluid lying on the same side as the inlet for the water vapour/hydrogen mixture, or their flow can be counter current, the inlet for the hot heat-transfer fluid lying on the opposite side to the inlet for the water vapour/hydrogen mixture.

With the fabrication of the electrolyser according to the invention, it is possible to modulate the voltage/intensity pair at the terminals of the electrolyser, this evidently being variable in relation to the number of plates connected in series. It is to be pointed out that the insulation characteristics of each cell, i.e. thickness and cost of fabrication, depend on the voltage of the passing current to avoid the onset of electric arcs.

If it is desired to produce a compact electrolyser with narrow thickness of electric insulation, all the plates 100 can be connected in parallel, since mosaic mounting makes it possible to transfer the stress of high intensity values of the supply current solely onto the power lead of the electrolyser, which can be achieved with a very large cross-section and maintaining at low temperature by cooling.

Figure 15A:
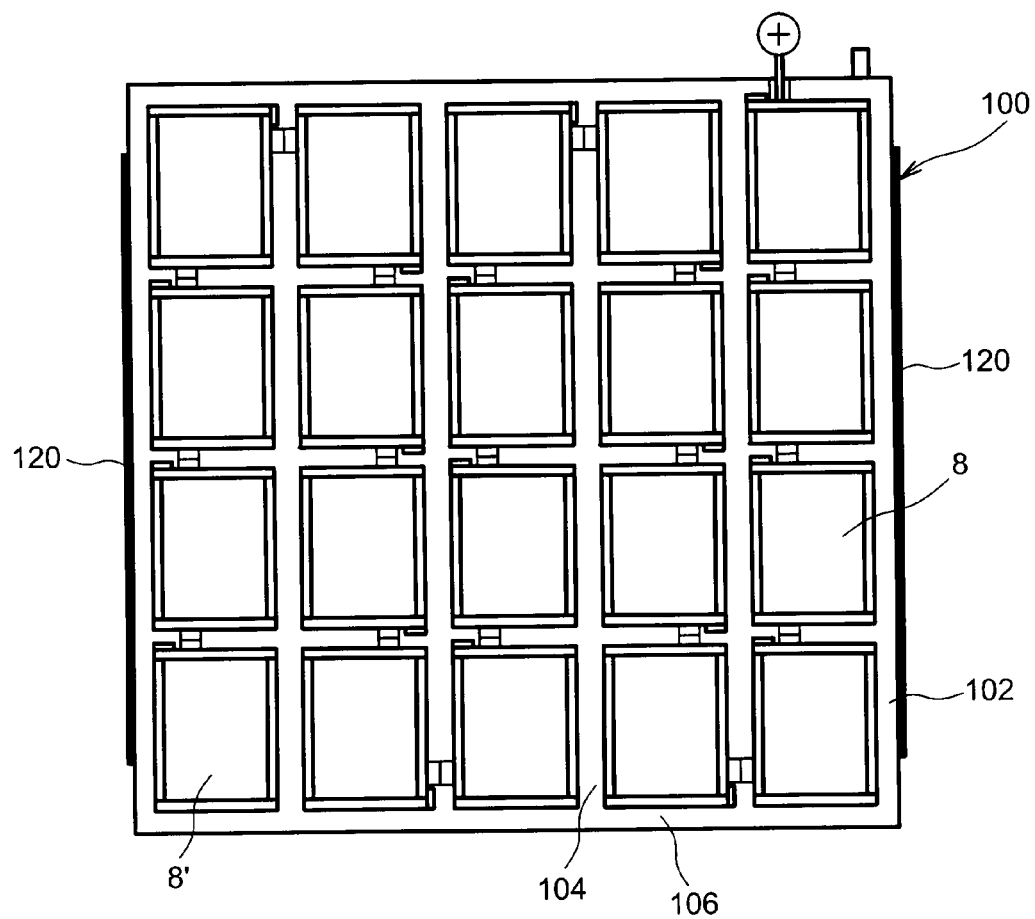
FIG. 15A is a front view of an electrolysis plate alone according to the second embodiment for connection in parallel thereof.
Figure 15B:
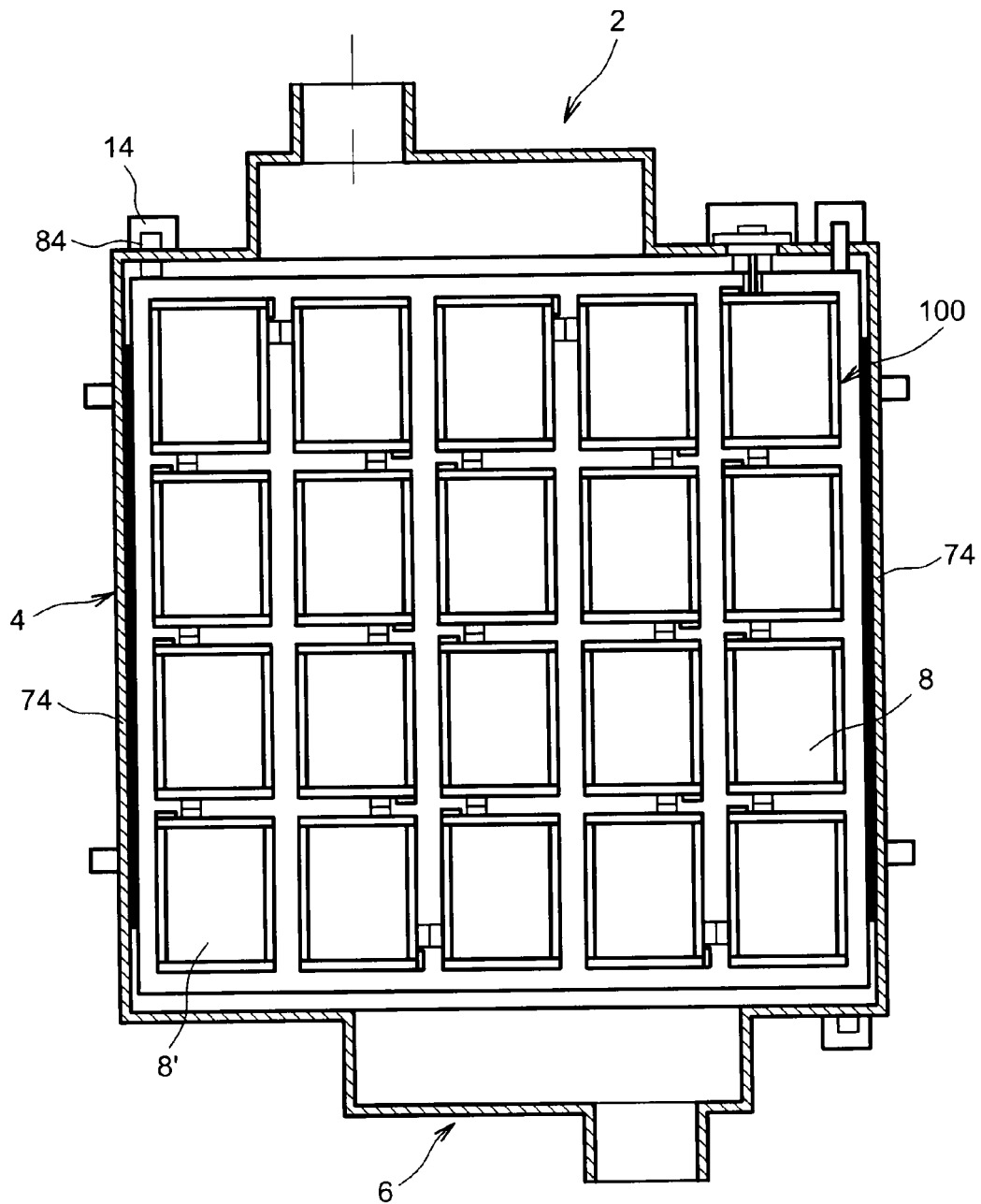
FIG. 15B is a cross-sectional view of the electrolyser according to the second embodiment at the plate shown
Figure 16A:
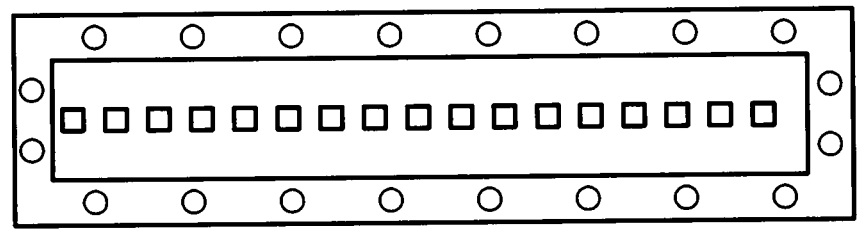
Figure 16B:
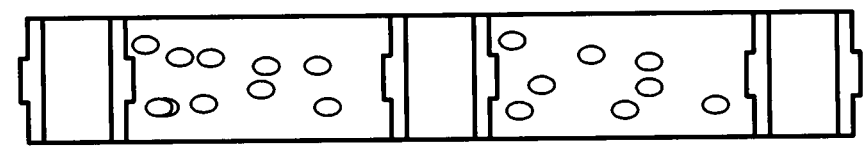
Figure 16C:
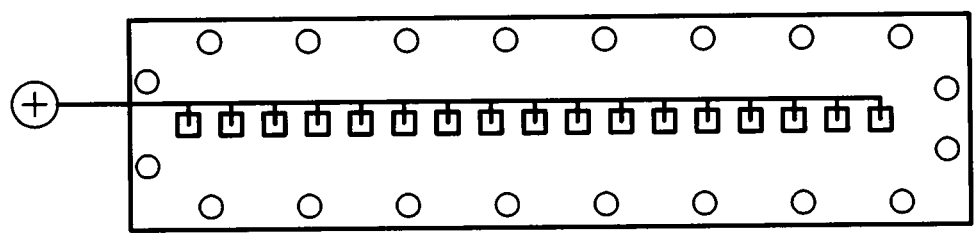

In a second embodiment, provision is made to connect the electrolysis plates in parallel, as illustrated FIGS. 15A and 15B. Compared with electrolysis plates in series, the last cell 8' of the last column is grounded and not connected to the first cell of the first column in the adjacent electrolysis plate.

It is ascertained, from the following example, that for an ordinary installation on an ordinary 380 V three-phase network it is easy, through use of a diode bridge upstream of the electrolyser and a protective system, to adapt the electrolyser directly to the available voltage of an electric network by calculating the number of cells per supporting frame (in the order of 205 cells for 220 V with domestic star-connection). Multiple combinations between the number of cells in series on one plate and the number of plates are possible.

It is most advantageous to connect the support plates in parallel, therefore the number of cells per plate depends on the voltage of the network, and the number of supporting frames depends on the production power of the unit.

The advantage of mounting in parallel is to move the stresses related to strong intensity currents to outside an enclosure at very high temperature, which largely facilitates technical solutions since it is sufficient to use metal conductors of large cross-section at low temperature.

It is also possible to reduce the number of inlets for metal conductors into the enclosure by grouping together the electrolysis plates 100 in small groups on a single main conductor.

The electrolyser according to the present invention therefore does not require any electric installation other than a current rectifier which can be integrated into the equipment.

If higher voltages are desired, it is possible to use very large plates or to place several supporting frames in series, so that their anode pins pass through the upper chamber for some and through the lower chamber for others.

An example will now be given of the sizing of an electrolyser according to the present invention, capable of producing 5 mole/sec, i.e. 432 Nm³/hour of hydrogen using cells of 10×10 cm² and 1.53 cm thick per plate, the cells are connected in series.

The support metal plates, e.g. in 800H steel or Hastelloy, measure 2.61 cm in height and 1.81 m in width for a thickness of 10 mm.

The heating plates 10 are of the same size (height and width) as the support plates and their thickness is 7.6 mm.

The space between a heating plate and a frame of an electrolysis cell in the order of 5 mm is maintained constant by means of spacers in electric insulating material.

Each electrolysis plate comprises 300 cells arranged over 15 vertical columns and 20 horizontal rows. For a current density of 2000 A/m², the current intensity passing through all the cells of a plate is 40 A, the voltage at the terminals of a plate is in the order of a 316 volts.

There are 81 electrolysis plates mounted in parallel and 82 heating plates 10.

The side slides 22, 24 measuring 1 cm, the (inner) dimensions of the electrolysis vessel are the following:

Height 2.61 m,
Width 1.83 m,
Length 2.70 m.

The electric power to be supplied to the electrolyser is 1.023 MW and the thermal power to be supplied is 213 kW (at 850° C.)

The flow rate of food-grade water vapour at 850° C. under 30 bars is 25 mol/s, its flow velocity between a heating plate and electrolysis plate is in the order of 4.5 cm/s and the head loss of the water vapour/hydrogen mixture through the electrolyser is in the order of 50 mbar.

With 294 mol/s the flow rate of the heat-transfer fluid, here food-grade helium at 900° C. under 30 bars, the outlet temperature of the hydrogen mixture is 852° C., the flow velocity of helium in the channels of the exchanger is in the order of 3.2 m/s and its head loss through the exchanger is in the order of 400 mbar.

It can be seen in the graph in FIG. 21 that, over the entire length of a plate 2.61 m in height, the maximum amplitude of variation in temperature is only 30.4° C. The solid line indicates the temperature of the water vapour/hydrogen mixture, and the dashed line indicates the temperature of the heat-transfer fluid.

The example described above concerns only one functioning point, it is possible by reducing the flow rate of food-grade water to increase the partial pressure of hydrogen.

As an example, by means of the invention, with a boiler delivering a heat-transfer fluid at 900° C., the entire electrolyser can be maintained within a reduced high temperature range [850° C.-880° C.] using a water vapour flow rate only five times the flow rate of the hydrogen produced, whilst providing 42 kJ per mole of hydrogen produced in the form of heat, i.e. one fifth of the electric energy consumed (204 kJ/mole H2, the remainder: 41 kJ/mole H2, is provided by vaporisation of the water upstream of the electrolyser through supply of heat in a steam generator.

For the molar flow rate of water vapour/produced hydrogen, a ratio in the range of 2 to 5 is particularly sought, to obtain a high partial vapour pressure of hydrogen whilst ensuring good covering of the electrolysis plates with water vapour.

A third particularly advantageous embodiment will now be described with reference to FIGS. 17A to 19 in which each column of each supporting frame are connected in parallel to each other. The electric connections, in the illustrated example, are only made at the lower wall of the enclosure.

This embodiment is of particular interest for large production units in which it is not desired to multiply the number of plates and the number of heating plates.

With very large support plates comprising a large number of cells in series, major values of difference in potential between supporting frame and cell are reached, then between cell and heating plate, thereby increasing risks of electric arcs between these different elements.

Figure 17B:
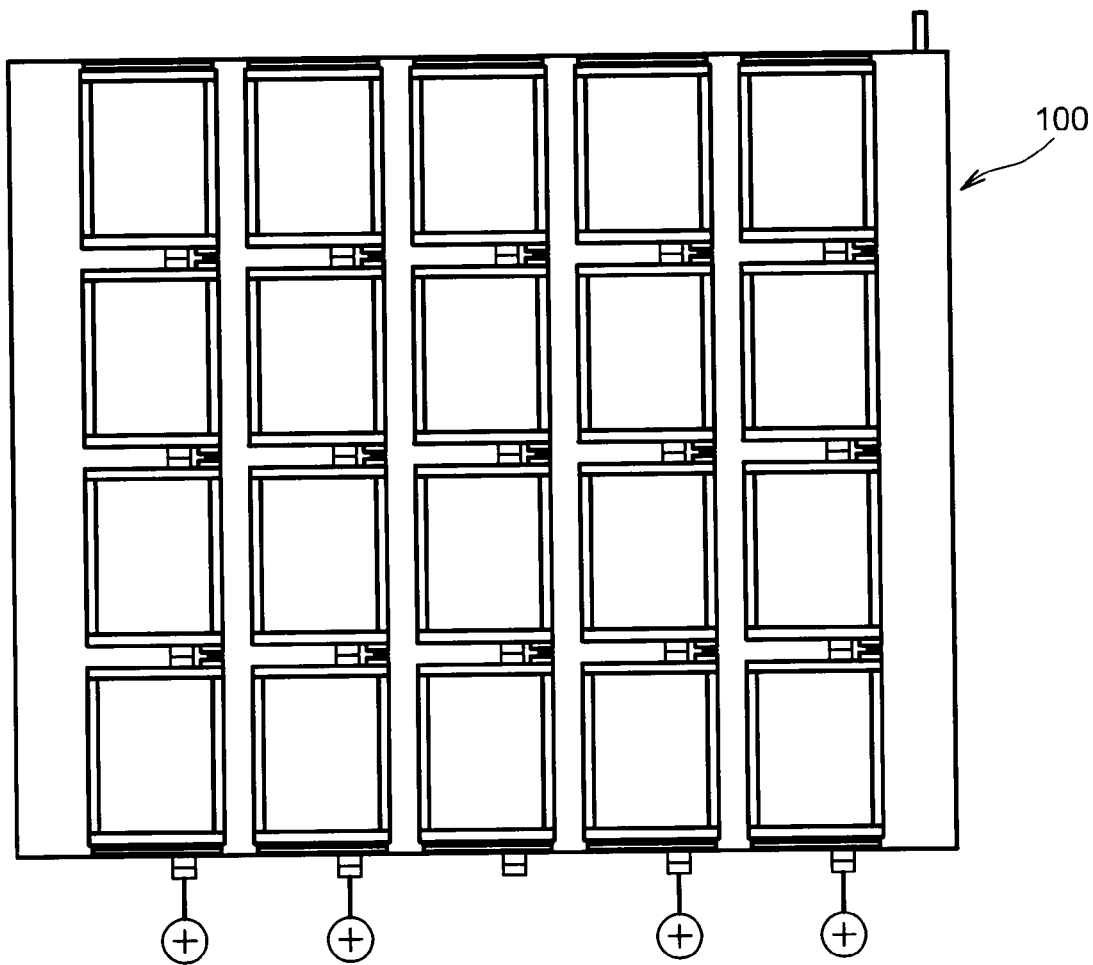
FIG. 17B is a front view of the electrolysis plate in the electrolyser according to the third embodiment.

According to the third embodiment shown FIGS. 17A and 17B, in each column of a plate, a number of cells is placed in series that is lower than the breakdown number, this number corresponds to the number of cells in series corresponding to the breakdown voltage; the columns are then all connected in parallel from one supporting frame to another.

In this third embodiment, provision is made to supply the water vapour laterally.

The median vessel 4 then comprises a supply baffle and a water vapour distributing plate 123 permitting regular distribution of water vapour over the entire height of the electrolysis plates. The median vessel 4 also comprises an outlet baffle 124 for the water mixed with the produced hydrogen.

Provision is advantageously made for an outlet manifold 126 for the water mixed with hydrogen on the upper part of the enclosure, which allows collection of a vapour mixture highly rich in hydrogen, but allows avoiding of the formation of a hydrogen head at the top of the enclosure.

Figure 18:
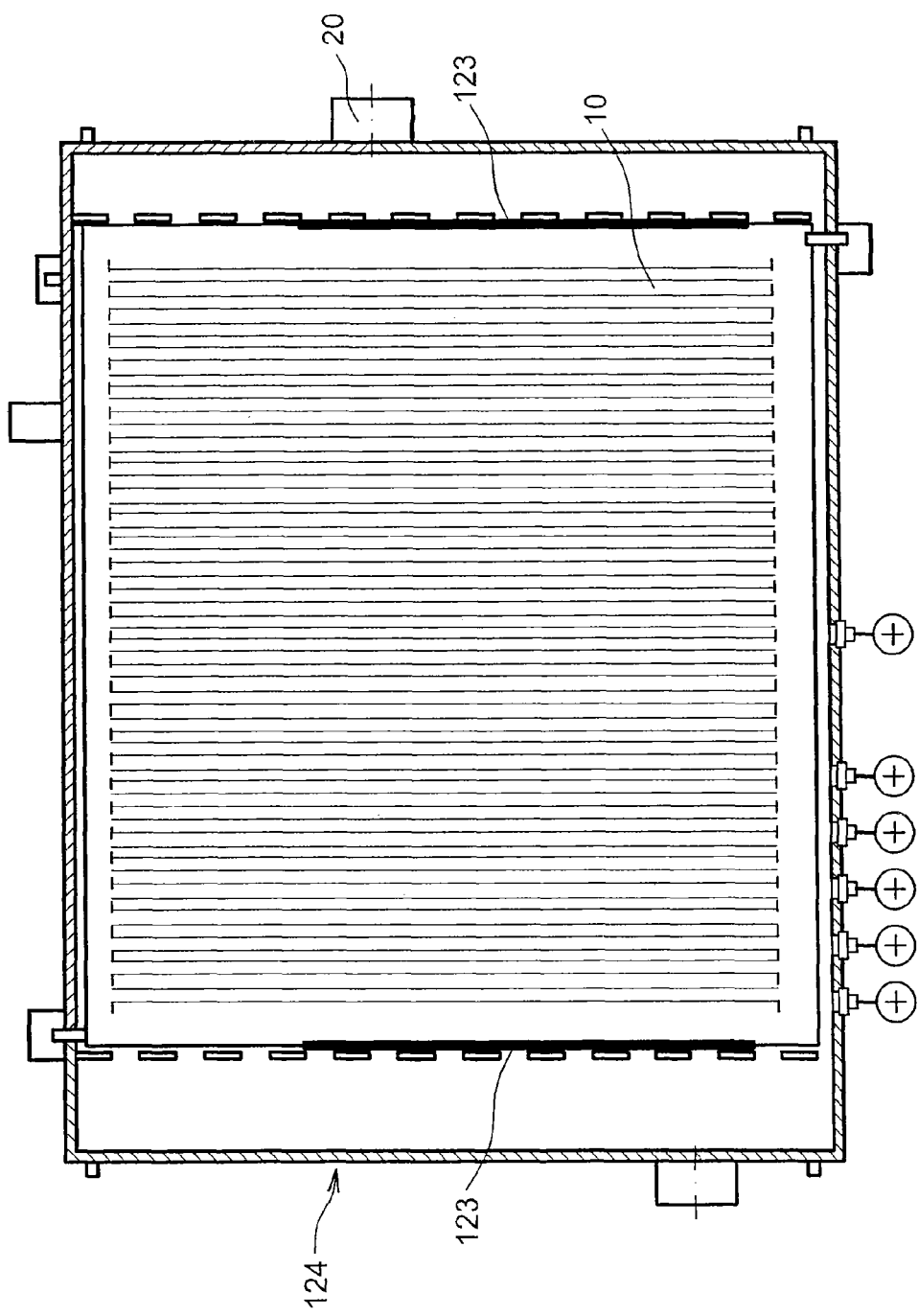
FIG. 18 is a cross-sectional view of the electrolyser according to the third embodiment at a heating plate.

FIG. 18 shows the mounting of a heating plate 10 in an electrolyser according to this embodiment with lateral supply.

Figure 19:
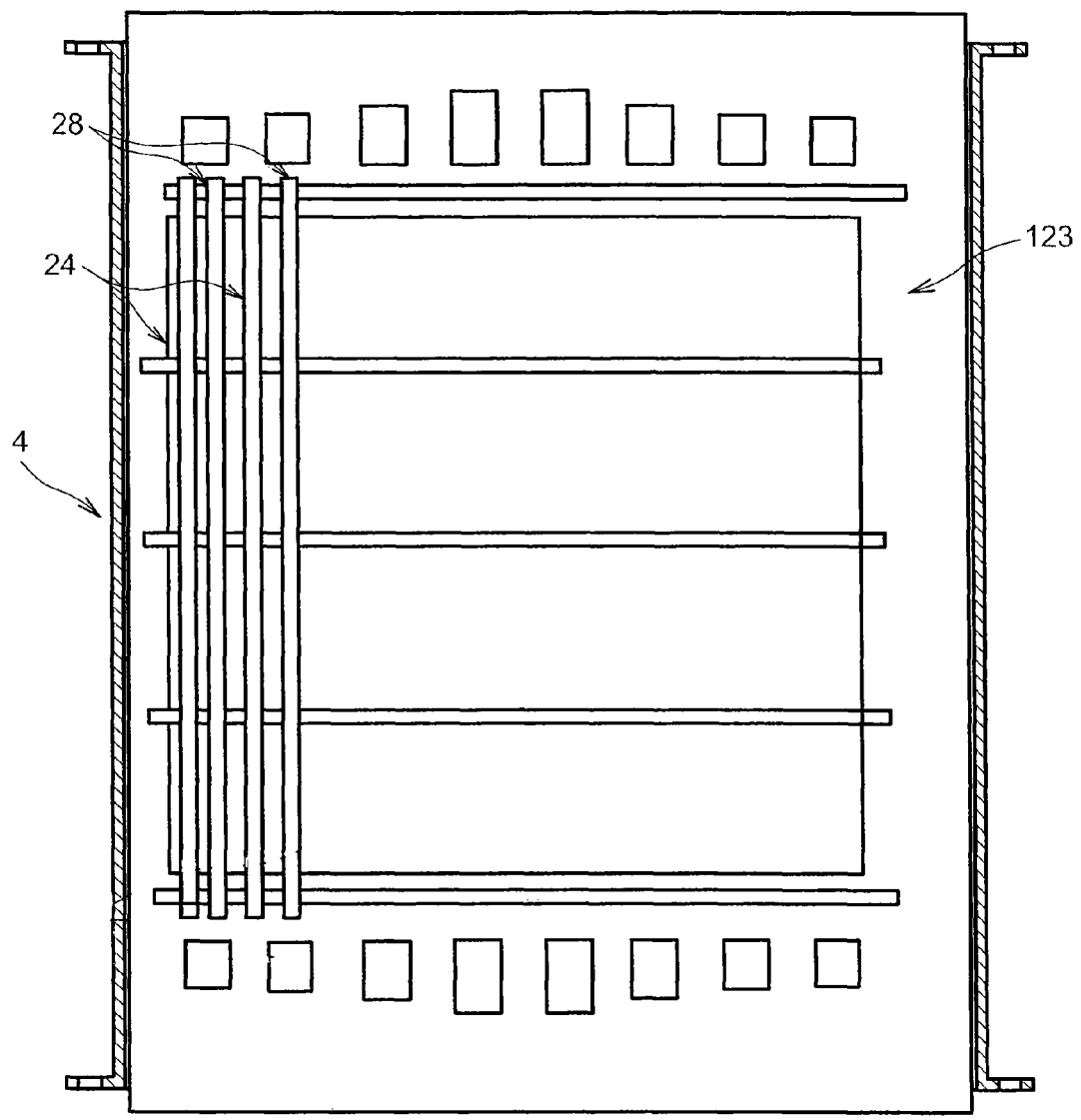
FIG. 19 is an inside view of a side wall of the enclosure at a distribution plate distributing the flow of electrolytic gas, provided with slides for assembling electrolysis and heating plates.
Figure 20:
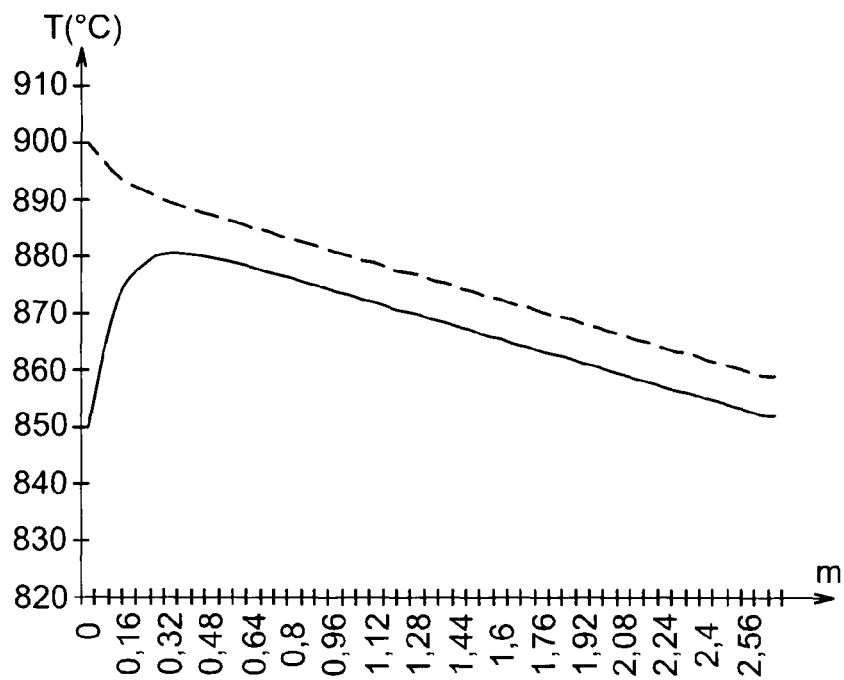
FIG. 20 shows the distribution of temperature values of a water/hydrogen mixture in ° C. of the heat-transfer fluid along an electrolysis plate (in meters) of an electrolyser according to the present invention.

FIG. 19 shows an active gas distribution plate 123 with its lumens 130 for passing of the gas and the slides welded onto horizontal bars.

Evidently the lateral supply of the third embodiment can be applied to the electrolyser according to the first and second embodiments.

In FIGS. 24 to 26C a fourth embodiment can be seen of an electrolysis plate according to the present invention, having the advantage of offering very low inter-cell connection resistance, of being easy to manufacture and largely modular.

Figure 24:
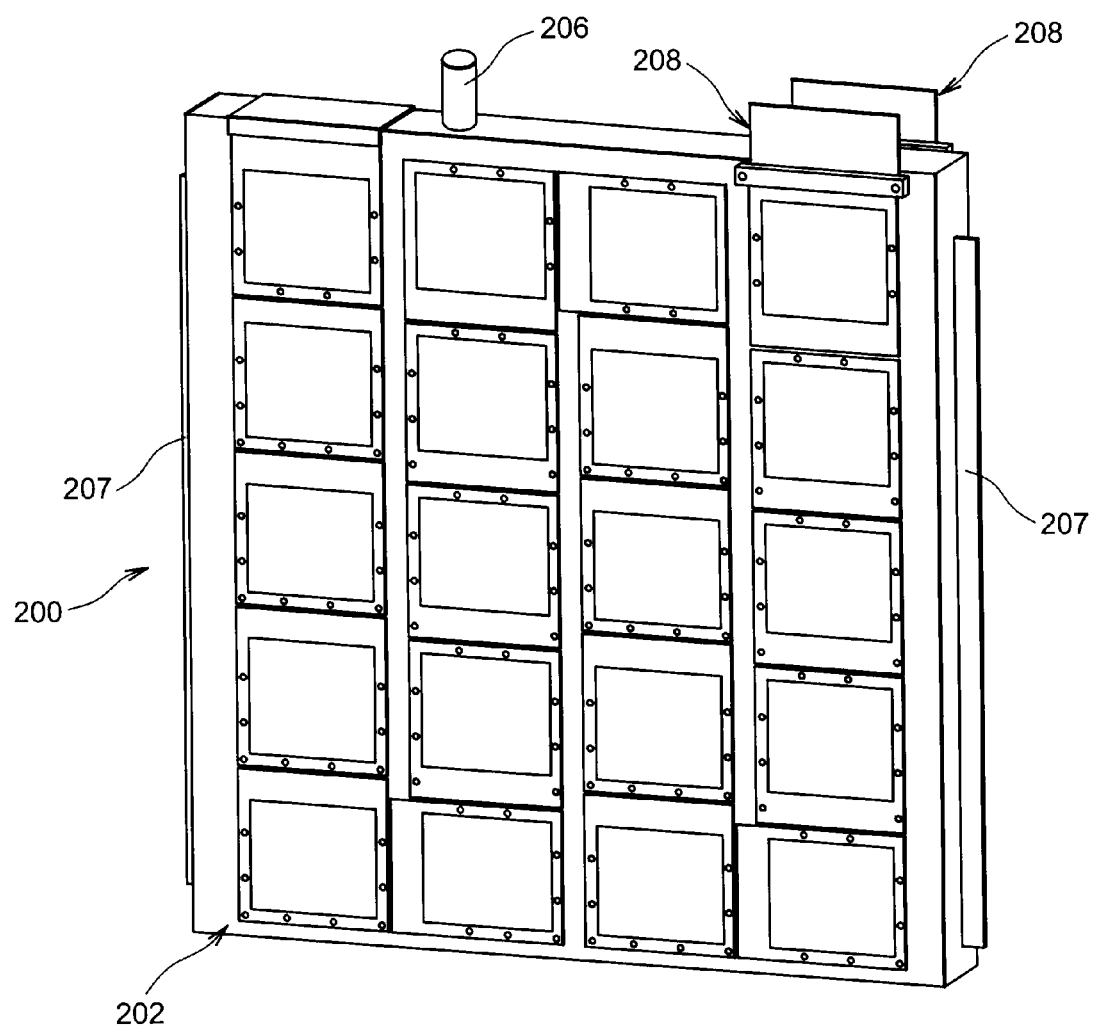
FIG. 24 is a perspective view of an electrolysis plate according to a fourth embodiment.
Figure 25:
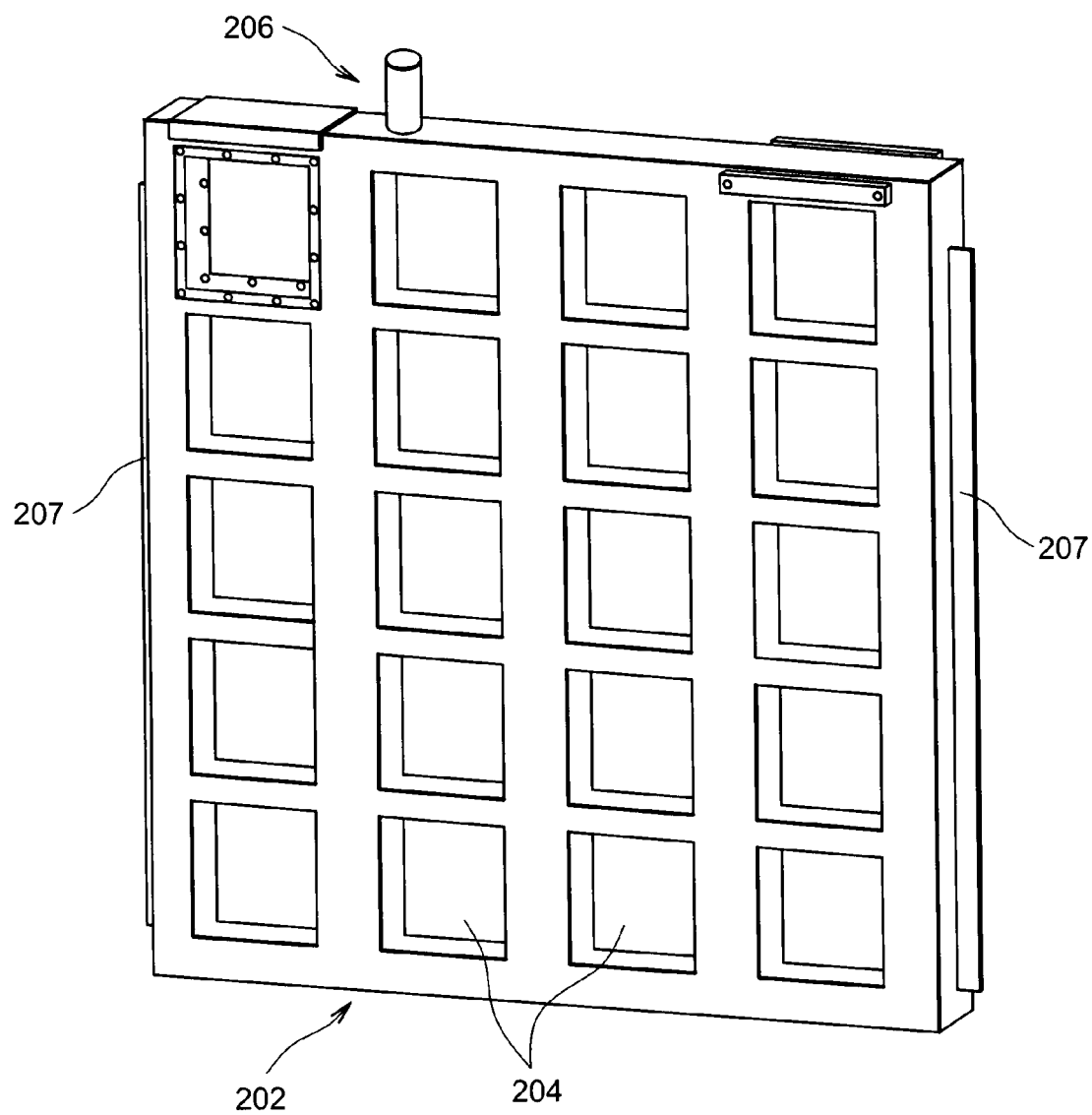
FIG. 25 is a perspective view of the support plate of the electrolysis plate shown
Figure 26A:
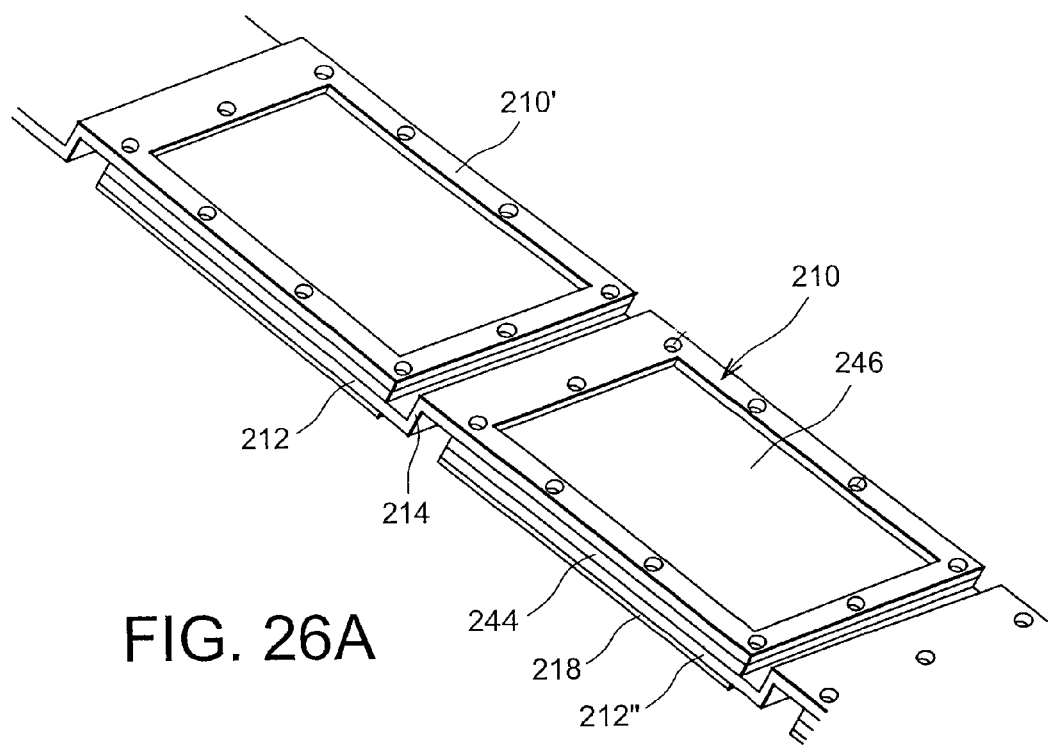
Figure 26B:
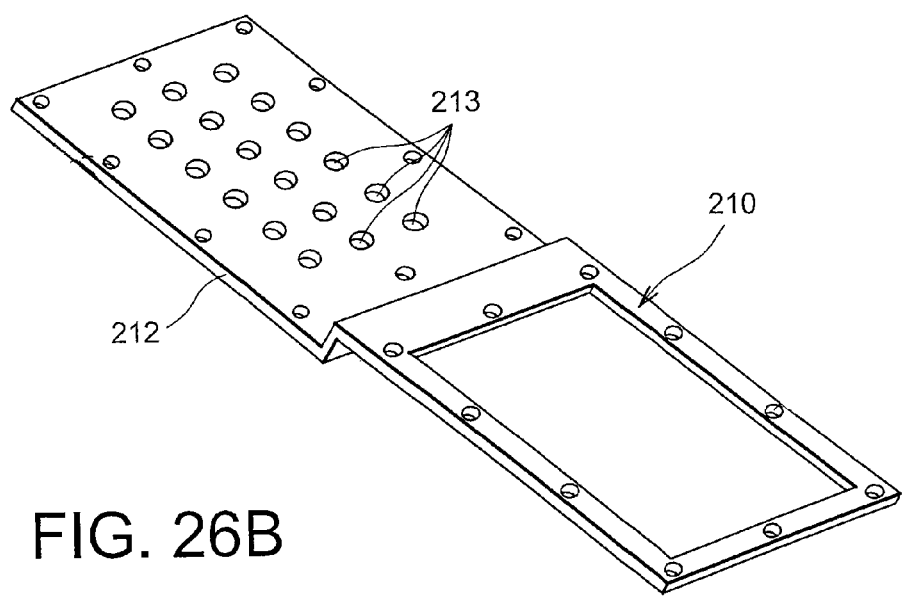
Figure 26C:
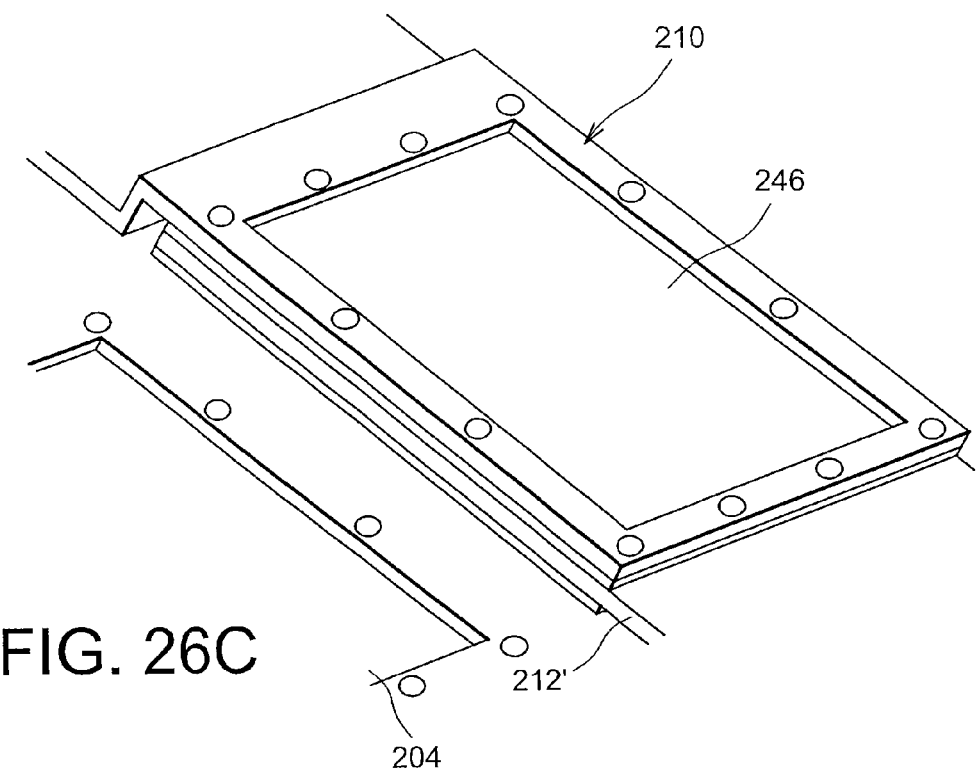

In FIG. 24 a complete electrolysis plate can be seen. FIG. 25 shows a support plate forming the frame of the electrolysis plate, and FIGS. 26A to 26C show the electrolysis cells insulated from the frame.

The electrolysis plate 200 comprises a support plate 202 provided with windows 204 distributed in rows and columns on its two faces.

Also, the support plate 202 is hollow so as to form a manifold for the dioxygen produced at the anodes, as will be seen below.

Advantageously, reinforcing uprights and crossbars are provided to rigidify the support plate, these being arranged so as not to hinder circulation of the dioxygen.

The support plate also comprises a dioxygen manifold 206, formed in the illustrated example by a sleeve on the upper part of the support plate 202, and pins 208 for anode and cathode connection to the other electrolysis plates for mounting in series or to the electrolyser power supply for mounting in parallel.

The support plate 202 can be made in metal or ceramic.

The electrolysis plate also comprises side guides 207 for mounting in the enclosure of the electrolyser.

If the support plate 202 is in metal and it is desired to mount the different electrolysis plates in series, grounding can be obtained via the lateral guides 207, the plates then only comprising an anode connector.

The plates in ceramic may comprise an anode connector and a cathode connector.

In FIGS. 26A to 26C electrolysis cells 208 can be seen, these comprise a central electrolyte 244 in the form of a plate, coated on one face by a cathode 246 and by an anode on an opposite face (not visible). The electrolyte is advantageously thicker on its side edges for assembly.

In this embodiment, the electrolyte advantageously comprises thicker edges, which allows lateral sealing of the assembly. As will be seen below, the mounting screws only pass through the electrolyte which simplifies assembly.

An additional peripheral seal surrounding the electrolyte may be provided to increase the sealing of the assembly. Provision may also be made to achieve a seal solely by means of a peripheral seal 247, as illustrated FIG. 26D, this seal being of lip type gripping together the edges of the electrolyte 244. This example of embodiment has the advantage of using an electrolyte of reduced size and of simplified shape.

According to this embodiment, an electrolysis cell is electrically connected to a following cell by an electric conductor of large cross-section.

The cell comprises a metal frame 210 arranged on the cathode 246 extended by a plate provided with holes 213, designated hereafter as a perforated plate 212 covering the anode of an adjacent cell 208'. The frame presses both on the edges of the electrolyte and the cathode; the perforated plate presses both on the anode and on the edges of the electrolyte. If there is additional peripheral seal, the seal is compressed between the frame and the perforated plate.

The frame 210 covers the outer edges of the cathode 246 and leaves most of the electrodes uncovered for the electrolysis reactions. The perforations of the perforated plate 212 allow passing of the dioxygen formed at the anode.

In the illustrated example, the frame 210 and the perforated plate 212 lie in two offset planes joined by a projection 214 substantially orthogonal to both planes. Advantageously the frame 210, plate 212 and projection 214 are made in one piece by stamping.

In the illustrated example, the frame 210 and perforated plate 212 comprise threading for fixing to a perforated plate 212' and to a frame 210' respectively, the frame 210' and the perforated plate 212" not belonging to the same cell, threads are tapped in the electrolyte.

The assembling of the electrolysis cells ensures application of a compression force on each anode-electrolyte-cathode assembly.

The threads 215 are used to mount all the elements of each cell onto the support plate. The screws are electrically insulated from the cell elements.

The cells are mounted on the support plate 202 so that the anode of each cell faces inwardly inside the support plate 202 which allows collection of the dioxygen by the support plate 202. A seal 218 is provided between each cell and the periphery of each window. This seal is compressed subsequent to clamped mounting. The seal is also an electrical insulator.

The shape and arrangement of the windows and of the face of the perforated plates applied against the windows can be optimized for improved sealing and better oxygen circulation.

Advantageously provision may be made for seal grooves on the windows receiving the seals. Provision may also be made to provide the windows with chamfered edges allowing the use of thicker seals without increasing the total thickness of the electrolysis plates.

The imperviousness of each assembly against the pressurized water vapour is ensured by the metal connectors which compress the edges of the electrolyte and by the seal 218.

The electric connection in series between the columns is made laterally as can be seen FIG. 24.

An embodiment of an electrolysis plate according to this fourth embodiment will now be described.

On the support plate, a perforated plate 212" is arranged, followed by an assembly formed of a cathode 246, an electrolyte 244 and an anode, the anode lying on the side of the perforated plate. Next, a frame 210 of a connector is placed on the cathode 246. The stack is then joined together by a screw.

A new assembly formed of a cathode, an electrolyte and an anode is placed on the perforated plate 212 of the new connector to form an adjacent cell connected in series with the cell previously formed. Mounting is continued in this manner on one column. A change in column is achieved by positioning a connector horizontally.

In the illustrated example, four columns of five cells are mounted on one face of the support plate 202. The same mounting is made on the other face. Evidently, several cells even several hundred cells can be mounted on one electrolysis plate.

It is possible to make provision for pre-assembly of cells in arrays e.g. of five cells. For this purpose, threads and screws are provided for pre-assembly and a thread and screw for mounting the support plate.

The anode and cathode pins 208 are advantageously formed by the perforated and frame (FIG. 24).

Evidently, the columns may be mounted in parallel.

Provision may be made for the two faces of the electrolyser plate to be connected in series as illustrated FIG. 24, for example by means of a connector overlapping the support plate and connecting two columns of cells. Provision may be made for connection to a terminal block through the support plate.

If mounting in parallel is desired, each face is connected directly to the general power supply of the electrolyser.

In the illustrated example, the columns are arranged vertically, but horizontal arrangement can also be considered.

Figure 28:
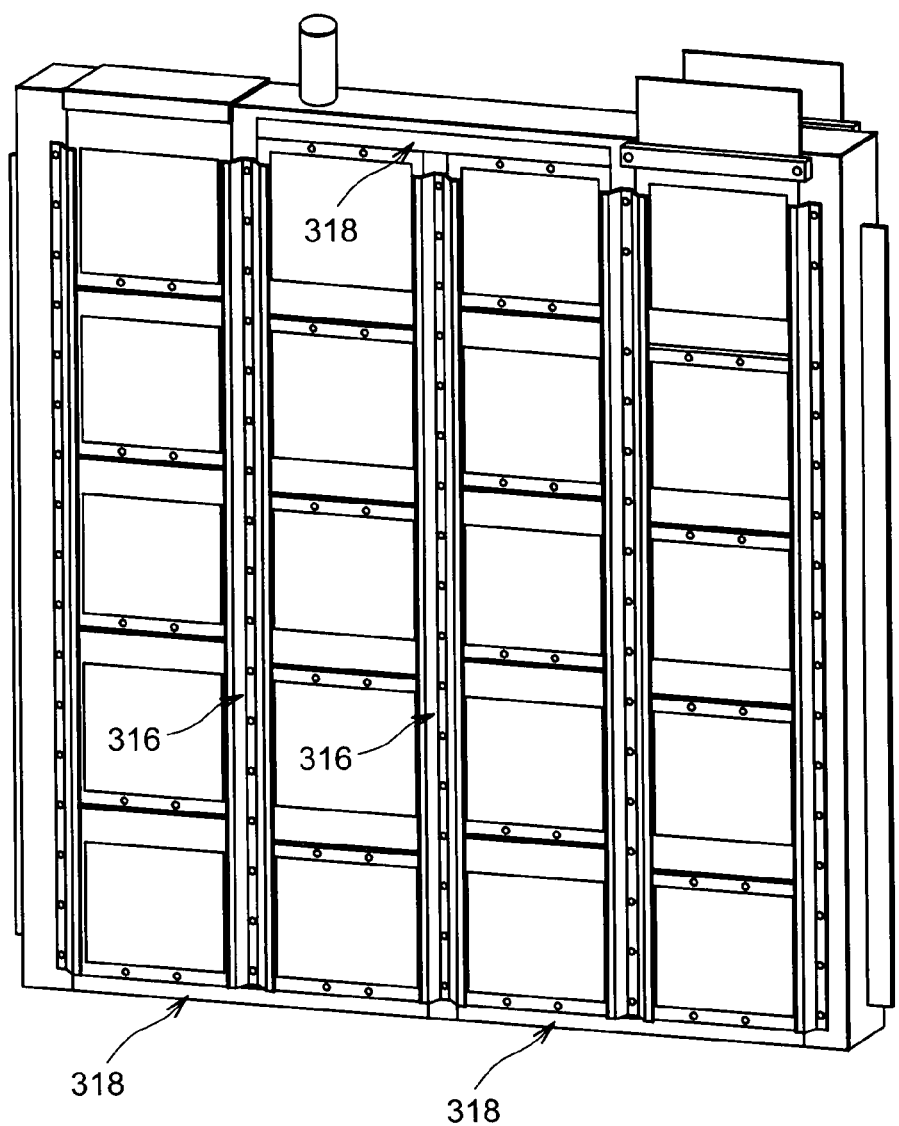
FIG. 28 is a front view of a variant of embodiment of an electrolysis plate according to the fourth embodiment.

FIG. 28 illustrates an advantageous variant of cell mounting on the support plate, in which the cells are fixed onto the support plate not by screws but by means of clamping profiles 316 which clamp together the side edges of the cells against the support plate.

The clamping profiles 316 are electrically insulated.

Figure 27:
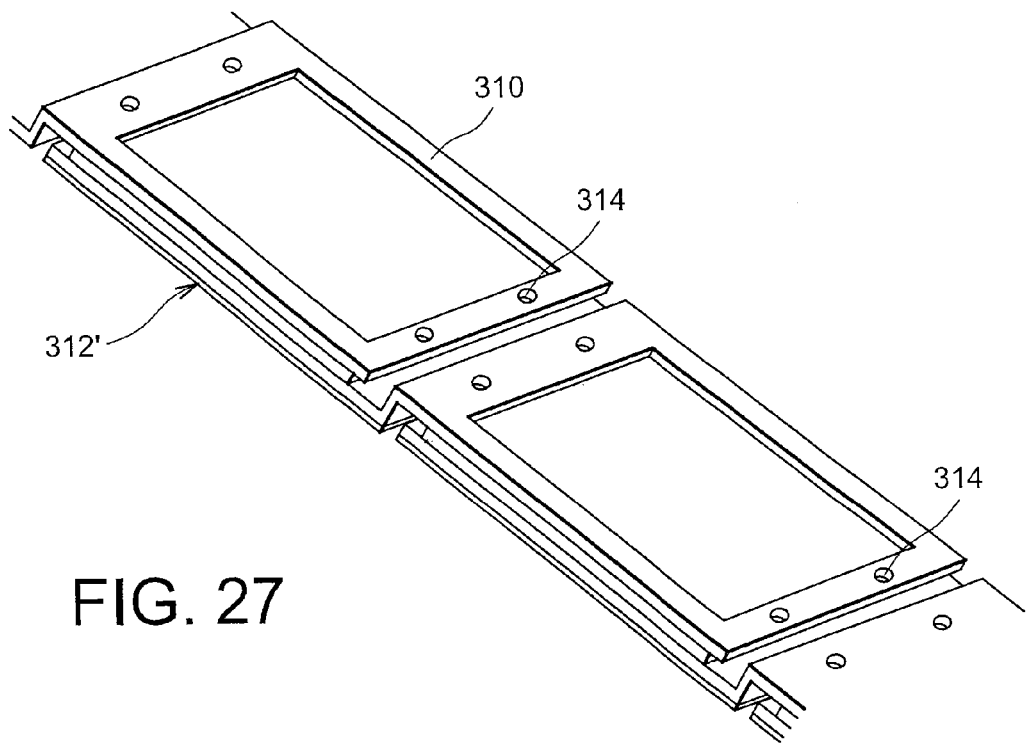
FIG. 27 is a perspective, overhead view of a variant of embodiment of the cell columns according to the fourth embodiment.
Figure 26D:
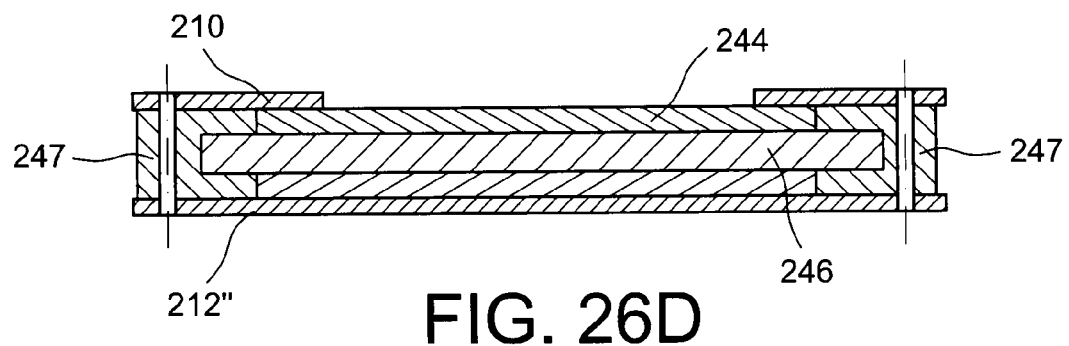
FIG. 26D is a cross-sectional view of a variant of embodiment of a cell shown FIG. 26A.

In the illustrated example, prior assembly in arrays is provided, shown FIG. 27, by joining a frame 310 of a connector with the perforated plate 312' of a following connector, the cathode-electrolyte-anode assembly being held clamped between the frame 310 and the perforated plate 312'. Joining together is ensured by electrically insulated screws passing through bores 314 made in the longitudinal ends of the frames and perforated plates.

FIG. 28 illustrates the clamping profiles 316 fixed by screws onto the support plate, the connection in series between the columns is obtained by connectors 318 fixed to the support plate. When mounting, the ends of two adjacent arrays are inserted in the connector 318. With this embodiment, all the connectors can be identical.

By using clamping profiles for mounting, the cell columns are able to expand freely along their longitudinal and lateral directions. There is effectively no fixed point and the cells are able to slide longitudinally and laterally relative to the clamping profiles and to the support plate whilst being held in place, which allows accommodation of cell deformations caused by variations in temperature during transitory phases of start-up and stoppage of the installation.

Additionally, by means of the clamping profiles, it is possible to mount all the cells of one column simultaneously.

In the illustrated example, the clamping profiles arranged between two columns of cells apply a clamping force on a side edge of the two columns. However two separate profiles could be envisaged.

Also, in the illustrated example, the profiles extend over the entire height of the support plate, but evidently several profiles placed end to end could be considered.

In this embodiment, the lateral sealing of each cell can be achieved by means of a peripheral seal around the anode-electrolyte-cathode assembly, the seal being compressed by the frame and perforated plate.

With this embodiment, it is possible to eliminate any contact resistance by forming continuous connections with quasi-zero connection resistance, since the connection between two adjacent cells is achieved through metal plates or metallic ceramic plates of large cross-section. They may effectively have a thickness of 1 to several millimeters and have a width at least equal to the width of the electrodes.

Further, it allows collection of the formed oxygen to be considerably simplified, since it eliminates all the oxygen collection parts of the other embodiments.

It also brings a reduction in the complexity of sealing, since only one flat seal remains ensuring a seal for the cells clamped by screws or clamping profiles, together with pressure of the water vapour on the support plate.

Also, it allows connection in series of the cells on both sides of a support plate without any contact resistance.

Additionally, it allows multiplication of the number of cells on one support plate and hence a reduction in the surface of each cell, whilst maintaining a constant total cathode surface for one support plate, permitting a reduction in the current supplied to the cells and in potential drop related to electric resistances.

This embodiment permits very large total cell surface areas. For a given hydrogen production level, it allows very low current density values of less than 2000 A/m2, which increases the endothermism of the electrolyser.

Finally, this embodiment simplifies the fabrication of the electrolysis cells, and the mass production of arrays of several tens even several hundred cells ready to be arranged on their support plate can be envisaged. The effect is to direct mass production towards modular fabrication of the different parts of the electrolysers. It is therefore possible to provide arrays of several tens of cells manufactured in one production unit, which are then sent to a mounting unit for mounting on the support plates, these then being sent to an electrolyser assembly unit.

In the illustrated example, the size of the windows is close to the size of the cells, but this is in no way imperative. It is possible to provide for windows of smaller size and for channels in the plates 212 to drain the oxygen produced at the anode towards the window. This structure facilitates sealing between the cells and the support plate.

The electrolyser according to the present invention has been described using as example the electrolysis of water and the collection of oxygen, however the architecture of the electrolyser according to the present invention can evidently be applied to the electrolysis of other gases and to the collection of any other gas.

The invention claimed is:

1. An electrolyser for high temperature electrolysis capable of operating in an allothermal mode, comprising:
    an enclosure configured to maintain an electrolytic bath at high or very high pressure of several tens of bars, in which a plurality of electrolysis plates are arranged parallel to each other; and
    heating means to heat an active fluid intended to undergo high temperature electrolysis with an operating temperature of at least 750° C., the electrolytic bath being formed by the active fluid, and the heating means using a heat-transfer fluid;
    the electrolysis plates comprising a plurality of electrolysis cells lying side by side substantially in one same plane, each electrolysis cell comprising an anode and a cathode, separate from the respective anodes and cathodes of the other cells, at least part of the electrolysis cells of the electrolysis plates being electrically connected in series,
    wherein the heating means includes a plurality of heating plates arranged on either side of the electrolysis plates, in which the heat-transfer fluid circulates, the heating plates are distinct from the electrolysis plates and not in contact with the electrolysis plates, and the electrolysis plates and the heating plates are immersed in the active fluid.

2. An electrolyser according to claim 1, wherein the electrolytic bath is in gaseous form.

3. An electrolyser according to claim 1, wherein the heat-transfer fluid is a gas under high pressure, or is helium.

4. An electrolyser according to claim 1, wherein the heat-transfer fluid is a molten metal, or is zinc.

5. An electrolyser according to claim 1, wherein the heat-transfer fluid is formed of molten salts.

6. An electrolyser according to claim 1, wherein the electrolysis plates each comprise a support plate comprising openings distributed in rows and columns on its two faces, the support plate being hollow to collect gas produced at the anode, the support plate comprising a manifold of the gas, at least part of the electrolysis cells being electrically connected two by two by a connector comprising a frame added onto a cathode of a cell and a perforated plate added onto an anode of an adjacent cell, so as to offer reduced electric connection resistance between the plates, and wherein each opening is closed by one of the electrolysis cells, each anode facing towards the inside of the support plate.

7. An electrolyser according to claim 6, wherein the anode and the cathode of each of the electrolysis cells are held compressed with an electrolyte by the frame of a respective connector and the perforated plate of another respective connector.

8. An electrolyser according to claim 7, comprising assemblies of the electrolysis cells forming elongate arrays, each array comprising an identical number of the anodes equal to the number of openings per row or per column, the arrays being connected in series.

9. An electrolyser according to claim 6, further comprising a seal between each perforated plate and the contour of the associated opening, the seal being compressed by means to fix the cells onto the support plate and by the pressure of the electrolytic bath at high or very high pressure.

10. An electrolyser according to claim 6, wherein the cells of the two faces are connected in series by a connector passing through the support plate or overlapping one of the side edges.

11. An electrolyser according to claim 1, wherein the electrolysis plate comprises plates each comprise a supporting frame comprising uprights delimiting rectangular windows arranged in rows and columns and in which the electrolysis cells of corresponding shape are arranged.

12. An electrolyser according to claim 11, wherein each electrolysis cell comprises a central body formed by an electrically conductive core in a form of a plate, coated on its two faces by the anodes, itself coated with an electrolyte, itself coated with the cathodes, and an electrically conductive casing surrounding the central body and in electric contact with the cathodes and exerting a compression force on the layers forming the central body, an anode pin and cathode electric connection carried by the casing, the cells being fixed on the supporting frame by the casing.

13. An electrolyser according to claim 12, wherein the casing comprises two semi-frames derived from either side of the central body so as to apply the layers one against the other, and means to insulate the anodes electrically from the casing being provided between the core, the anodes and the casing.

14. An electrolyser according to claim 12, further comprising collection means to collect the gas or gases produced at the anodes towards outside the electrolyser.

15. An electrolyser according to claim 14, wherein the collection means comprises at least one channel made in the anodes and connected to a collection end-piece, and the supporting frame, the supporting frame being hollow and forming a manifold of the gas or gases, the collection end-piece being sealingly connected to the supporting frame, the frame taking the produced gas or gases to outside the electrolyser, the pressure of the gas or gases produced at the anode being lower than the pressure at the cathode of the electrolytic bath, the anodes, electrolyte and cathodes therefore being pressed one against the other.

16. An electrolyser according to claim 15, wherein grooves and reservoirs are made in a core of the electrolysis cell, one of the reservoirs being connected to the collection end-piece of the gas or gases, the end-piece being brazed onto a connector provided between the connector and the supporting frame.

17. An electrolyser according to claim 1, wherein the heating plates are substantially of same size as the electrolysis plates and comprise a metal casing in which a heat-exchange body is arranged comprising a plurality of channels extending between one end supplied with hot heat-transfer fluid and one end connected to a manifold of cold heat-transfer fluid.

18. An electrolyser according to claim 17, wherein the enclosure comprises side slides receiving side edges of the heating plates and of the electrolysis plates, means to insulate the supporting frame electrically from the enclosure being provided in the slides.

19. An electrolyser according to claim 1, wherein the electrolysis cells are distributed in rows and columns, the cells of one same column being electrically connected in series, the columns being connected in series and the electrolysis plates being connected in series with each other.

20. An electrolyser according to claim 1, wherein the electrolysis cells are distributed in rows and columns, the cells of one same column being electrically connected in series, the columns being connected in series and the electrolysis plates being connected in parallel.

21. An electrolyser according to claim 19, wherein the electric connections between the different plates and with an electric power source are provided outside the enclosure.

22. An electrolyser according to claim 21, wherein the electric connections are cooled.

23. An electrolyser according to claim 1, wherein the enclosure comprises an inlet orifice for active fluid provided on a side wall orthogonal to the electrolysis plates.

24. An electrolyser according to claim 1, wherein the enclosure comprises at least one orifice to collect the gas or gases generated at the cathodes on an upper wall of the enclosure.

25. An installation to produce gas by electrolysis comprising:
at least one electrolyser for high temperature electrolysis configured to operate in an allothermal mode, comprising:
an enclosure configured to maintain an electrolytic bath at high or very high pressure of several tens of bars, in which a plurality of electrolysis plates are arranged parallel to each other; and
heating means to heat an active fluid intended to undergo high temperature electrolysis with an operating temperature of at least 750° C., the electrolytic bath being formed by the active fluid, and the heating means using a heat-transfer fluid;
the electrolysis plates comprising a plurality of electrolysis cells lying side by side substantially in one same plane, each electrolysis cell comprising an anode and a cathode, separate from the respective anodes and cathodes of the other cells, at least part of the electrolysis cells of an electrolysis plates being electrically connected in series,
wherein the heating means are formed of a plurality of heating plates arranged either side of the electrolysis plates, in which the heat-transfer fluid circulates, the heating plates are distinct from the electrolysis plates and not in contact with the electrolysis plates, and the electrolysis plates and the heating plates are immersed in the active fluid; and
an electric supply at a given voltage.

26. An installation according to claim 25, wherein the cells of one same plate are connected in series and the electrolysis plates are connected in parallel, the number of electrolysis cells per electrolysis plate being chosen in relation to the given voltage of the electric supply.

27. An installation according to claim 25, wherein the electrolysis cells of each plate are distributed in rows and columns, the cells of each column being connected in series, the columns being connected in parallel, the number of cells of each column being chosen in relation to the given voltage of the electric supply.

28. A method to produce dihydrogen and oxygen by electrolysis from water, using an electrolyser according to claim 1, wherein the pressure of the electrolytic bath is substantially equal to or more than a storage and/or distribution pressure of dihydrogen or dioxygen, or between 30 bars and 130 bars.

29. A method to produce dihydrogen and dioxygen by electrolysis according to claim 28, wherein the ratio between molar flow rate of water vapor and molar flow rate of the produced dihydrogen is 2 to 5.

* * * * *